US007642953B2

(12) United States Patent
Cheng et al.

(10) Patent No.: US 7,642,953 B2
(45) Date of Patent: Jan. 5, 2010

(54) METHOD AND APPARATUS FOR THREE DIMENSIONAL TOMOGRAPHIC IMAGE RECONSTRUCTION OF OBJECTS

(75) Inventors: Shirley N. Cheng, Richmond Heights, MO (US); Peter Wittenberg, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 158 days.

(21) Appl. No.: 11/780,134

(22) Filed: Jul. 19, 2007

(65) Prior Publication Data

US 2009/0021423 A1 Jan. 22, 2009

(51) Int. Cl.
*G01S 13/89* (2006.01)
(52) U.S. Cl. ..................................... 342/179
(58) Field of Classification Search .............. 702/5; 701/202, 223, 2; 342/179, 180, 25 R–25 F, 342/26 A–26 D
See application file for complete search history.

(56) References Cited

U.S. PATENT DOCUMENTS

| | | | | |
|---|---|---|---|---|
| 4,814,711 | A * | 3/1989 | Olsen et al. ................. | 324/331 |
| 6,718,261 | B2 * | 4/2004 | Mattheyses et al. ......... | 701/202 |
| 6,842,674 | B2 * | 1/2005 | Solomon ..................... | 701/23 |
| 7,032,858 | B2 * | 4/2006 | Williams .................... | 244/3.15 |
| 7,123,169 | B2 * | 10/2006 | Farmer et al. ............... | 340/945 |
| 7,338,009 | B1 * | 3/2008 | Bobinchak et al. .......... | 244/3.15 |
| 7,365,674 | B2 * | 4/2008 | Tillotson et al. ............ | 342/26 B |
| 2006/0257010 | A1 * | 11/2006 | George et al. ............... | 382/131 |

OTHER PUBLICATIONS

Falconer, D.G., and Moussally, G.J., "Tomographic imaging of radar data gathered on a circular flight path about a three-dimensional target zone", Proceedings of the SPIE—The International Society for Optical Engineering, 1995, vol. 2487, p. 2-12.*
Denney et al., "Scattering-based tomography for HRR and SAR prediction", Multidimensional systems and Signal Processing, 14, 2003, pp. 207-222.

* cited by examiner

*Primary Examiner*—Thomas H Tarcza
*Assistant Examiner*—Cassi Galt
(74) *Attorney, Agent, or Firm*—Yee & Associates, P.C.; Brook Assefa

(57) ABSTRACT

In accordance with an embodiment, a system includes a plurality of vehicles and a central node. The plurality of vehicles each have radar systems used to collect radar data about the target object. Each in the plurality of vehicles moves in a path to collect a portion of the radar data using a sampling map to coordinate collection of the radar data by the plurality of vehicles and communicates with every other vehicle to identify uncollected portions of the radar data. The central node is in communication with the plurality of vehicles, wherein the central node receives the radar data from the plurality of vehicles and creates a three dimensional image from the radar data received from the plurality of vehicles using a tomographic reconstruction process.

30 Claims, 22 Drawing Sheets

FIG. 6

| NAME | SYMBOL | UNIT | |
|---|---|---|---|
| TOKEN ID | ID_T | N/A | 602 |
| OBSERVER ID | ID_O | N/A | 604 |
| TOKEN BATCH ID | ID_B | N/A | 606 |
| BATCH TIME STAMP | Tb | SECONDS | 608 |
| OBSERVER POSITION AND ATTITUDE TIME STAMP | To | SECONDS | 610 |
| OBSERVER ELEVATION ANGLE | $\theta o$ | DEGREES | 612 |
| OBSERVER HEADING ANGLE | $\phi o$ | DEGREES | 614 |
| OBSERVER RANGE TO CENTER | Ro | METERS | 616 |
| OBSERVER PITCH ANGLE | $\theta a$ | DEGREES | 618 |
| OBSERVER YAW ANGLE | $\phi a$ | DEGREES | 620 |
| RADAR MOUNTING LEVER ARM | $\delta x$ | METERS | 622 |
| RADAR MOUNTING LEVER ARM | $\delta y$ | METERS | 624 |
| RADAR MOUNTING LEVER ARM | $\delta z$ | METERS | 626 |
| RADAR DATA COLLECTION TIME STAMP | Tr | SECONDS | 628 |
| RADAR ELEVATION POINTING ANGLE | $\theta g$ | DEGREES | 630 |
| RADAR AZIMUTH POINTING ANGLE | $\phi g$ | DEGREES | 632 |
| RADAR RETURN RANGE | Rs | METERS | 634 |
| RADAR FREQUENCY | fc | Hz | 636 |
| RADAR FREQUENCY MODULATION RATE | fm | Hz/SECOND | 638 |
| RADAR COHERENT DETECTION DWELL TIME | Td | SECONDS | 640 |
| RADAR MOVING TARGET DETECTION x-VELOCITY | Vx | METERS/SECOND | 642 |
| RADAR MOVING TARGET DETECTION y-VELOCITY | Vy | METERS/SECOND | 644 |
| RADAR MOVING TARGET DETECTION z-VELOCITY | Vz | METERS/SECOND | 646 |
| CENTRAL NODE COMMAND | CMD | N/A | 648 |
| CENTRAL NODE COMMAND TIME STAMP | Tcue | SECONDS | 650 |
| CENTRAL NODE/OBJECT POSITION x | Xcue | METERS | 652 |
| CENTRAL NODE/OBJECT POSITION y | Ycue | METERS | 654 |
| CENTRAL NODE/OBJECT POSITION z | Zcue | METERS | 656 |
| x POSITION SIGMA | $\sigma_x$ | METERS | 658 |
| y POSITION SIGMA | $\sigma_y$ | METERS | 660 |
| z POSITION SIGMA | $\sigma_z$ | METERS | 662 |
| POSITION x-VELOCITY | Vx | METERS/SECOND | 664 |
| POSITION y-VELOCITY | Vy | METERS/SECOND | 666 |
| POSITION z-VELOCITY | Vz | METERS/SECOND | 668 |

METHOD AND APPARATUS FOR THREE DIMENSIONAL TOMOGRAPHIC IMAGE RECONSTRUCTION OF OBJECTS

BACKGROUND INFORMATION

1. Field

The present invention relates generally to an improved data processing system and in particular to a method and apparatus for processing image data. Still more particularly, the present invention relates to a computer implemented method, apparatus, and computer usable program code for three dimensional tomographic image reconstruction of objects.

2. Background

Identifying targets or objects by their features of interest in a three dimensional space is a desirable objective for use in identifying unknown objects. Currently, synthetic aperture radar (SAR) is a form of coherent radar in which sophisticated post-processing of data obtained by this type of system is used to produce three dimensional radar images. Stereo synthetic aperture radar systems extract range information from the geometric disparity between two different views on the same point for a three dimensional object. With this type of system, a registration technique is needed to register that point on multiple images. In the presence of clutter and when the object is moving, an accurate registration becomes extremely challenging.

Another type of stereo aperture radar system is interferometric system aperture radar, which derives directly the relative height of a point of a three dimensional object from the interference pattern of radar returns received by two antennas that are separated vertically by a base. The ability of this type of system to resolve height information is determined by the size of the base between two antennas. The antenna base may affect deployment of this type of radar on small size airborne vehicles.

Laser imaging detection and range systems send out light beams to "paint" an object. These systems then measure the time-of-flight of return beams to reconstruct a distribution of reflective coefficients for a three dimensional object. One shortcoming of this type of system is that laser imaging detection and ranging systems are limited by weather conditions and air quality. Therefore, there remains a need in the art for a detection system that is less limited by weather conditions and air quality.

SUMMARY

The different advantageous embodiments provide a system for creating a three dimensional image of a target object. The system comprises a plurality of vehicles and a central node. The plurality of vehicles each have radar systems used to collect radar data about the target object. Each in the plurality of vehicles moves in a path to collect a portion of the radar data using a sampling map to coordinate collection of the radar data by the plurality of vehicles and communicates with every other vehicle to identify uncollected portions of the radar data. The central node is in communication with the plurality of vehicles, wherein the central node receives the radar data from the plurality of vehicles and creates a three dimensional image from the radar data received from the plurality of vehicles using a tomographic reconstruction process.

In another advantageous embodiment, an apparatus comprise a coordinated network centric data collection system and a central node. The coordinated network centric data collection system has a plurality of nodes moving in a coordinated formation to collect radar data about a target object in which different nodes in the plurality of nodes collect different portions of the radar data using a sampling map that identifies the different portions of the radar data needed to create a three dimensional image of the target object. The central node receives the different portions of the radar data collected by the plurality of nodes and constructs the three dimensional image of the target object from the different portions of the radar data.

In yet another advantageous embodiment, a processing unit processes processing data collected by a selected observer node in a plurality of observer nodes. The processing unit comprises a filter, a token bank, a sinogram unit, a token generation unit, and an optimization algorithm. The filter is in communication with a radar system associated with the selected observer node and is capable of filtering radar data received from the radar system. The token bank is capable of receiving tokens from a communications link with other observer nodes in the plurality of observer nodes. The tokens received from a remote observer node in the plurality of observer nodes through the communications link are stored in the token bank. A token identifies a position and a location of an observer node when the observer node collects the radar data. The sinogram unit is connected to the token bank, wherein the sinogram unit generates a sinogram used to identify a plurality of samples in a sampling space needed for reconstructing a three dimension image of a target object. The token generation unit is connected to the filter and generates a new token in response to receiving radar data from the radar system. The optimization algorithm unit is connected to the sinogram unit and is capable of generating control instructions using the sinogram, wherein the control instructions are used to direct movement of the observer node to collect a sample in the plurality of samples.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

FIG. 6 is a diagram of a token in accordance with an advantageous embodiment;

DETAILED DESCRIPTION

Figure 1:
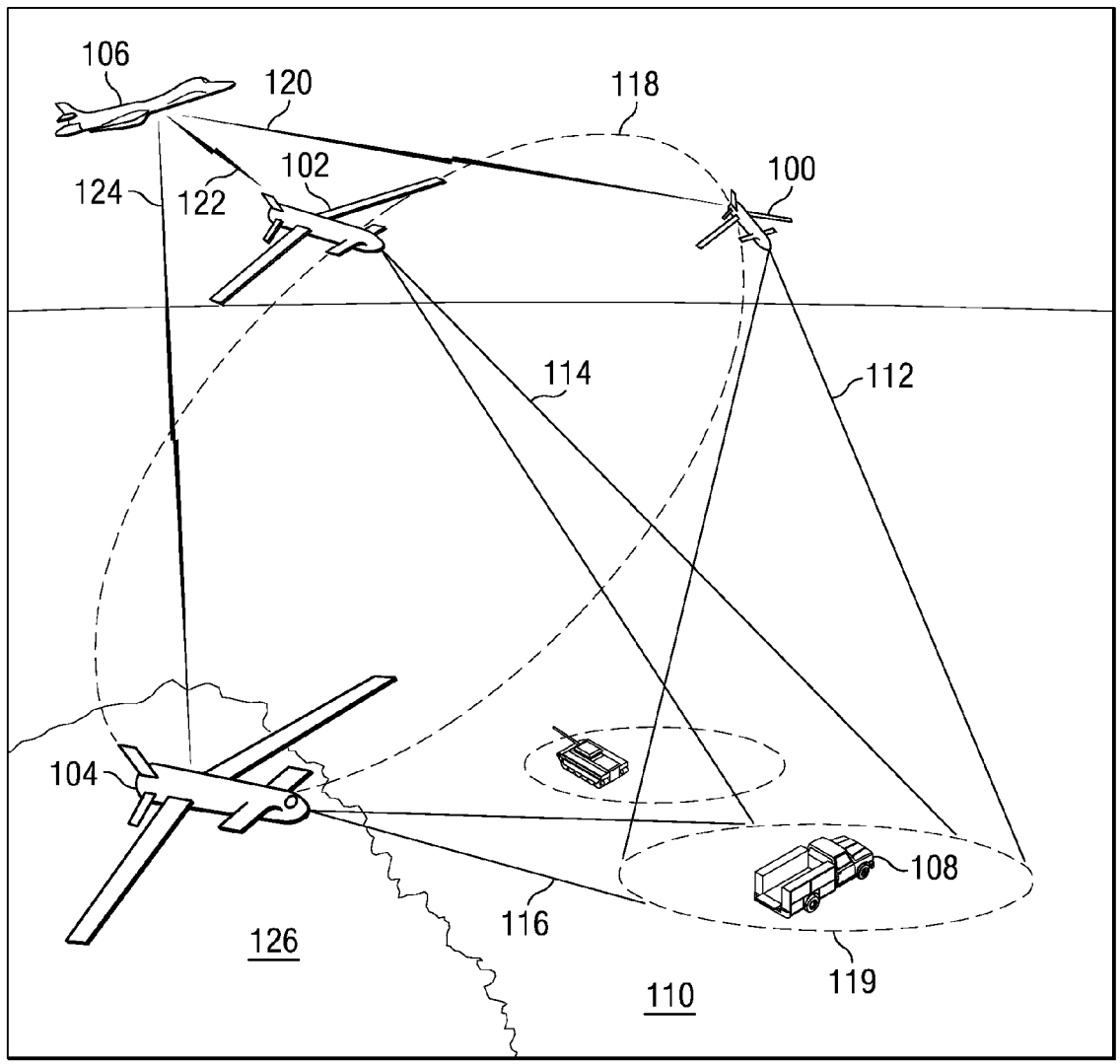
FIG. 1 is a system for creating a three dimensional image of an object in which an advantageous embodiment of the present invention may be implemented.

With reference now to the figures and in particular with reference to FIG. 1, a system for creating a three dimensional image of a target object is depicted in accordance with an advantageous embodiment. In this example, the system includes a coordinated network centric data collection system and a central node. The coordinated network centric data collection system contains nodes in the form of unmanned aerial vehicle (UAV) 100, unmanned aerial vehicle 102, and unmanned aerial vehicle 104. The central node takes the form of aircraft 106 in this particular example.

Unmanned aerial vehicles 100, 102, and 104 collect data for target object 108 on ground 110. In these particular examples, the data is radar data. Radar data is generated by unmanned aerial vehicles 100, 102, and 104 projecting beams or cones of electromagnetic radiation from radar systems onto target object 108 and collecting the data that returns from those beams or cones. In this example, unmanned aerial vehicle 100 projects cone 112; unmanned aerial vehicle 102 projects cone 114, and unmanned aerial vehicle 104 projects cone 116.

In response to these cones being projected, the different unmanned aerial vehicles collect the signals that return from those cones. These collected signals form the data collected by coordinated network centric data collection system. These collected signals are referred to as radar data. In some instances, the central node, aircraft 106, or unmanned aerial vehicles project electromagnetic radiation. In this example, all other nodes only receive the reflected energy in a passive manner.

Unmanned aerial vehicles 100, 102, and 104 communicate with each other through communications links 118 to coordinate the collection of the different portions of the radar data needed to construct an image of target object 108. In these examples, unmanned aerial vehicles 100, 102, and 104 direct cones 112, 114, and 116 into area 119. Area 119 is an area of uncertainty (AOU) in which unmanned aerial vehicles 100, 102, and 104 move around or fly around to obtain radar data of target object 108 at different angles. Of course, area 119 may shift as target object 108 moves.

The different portions of the radar data collected by unmanned aerial vehicles 100, 102, and 104 are transmitted to aircraft 106 through communications links 120, 122, and 124, respectively. In these examples, the different communications links are wireless communications links.

In these particular examples, aircraft 106 is a central node that constructs a three dimensional image of target object 108 using a tomographic reconstruction process. The image is constructed such that it has a sufficient amount of detail to identify target object 108. As a result, a complete image of area 119 may not be necessary to identify target object 108. Communications links 118 are used by unmanned aerial vehicles 100, 102, and 104 to communicate with each other to coordinate the movement of the formation of these vehicles. This communication allows each unmanned aerial vehicle to let the other unmanned aerial vehicles know where they are located and know what portions of the radar data needed to construct the three dimensional image have been collected.

Although, in these examples, the different nodes in the coordinated network centric data collection system take the form of unmanned aerial vehicles, the nodes may take other forms. The nodes may be heterogeneous or homogeneous. In other words, the different nodes may be of the same type or different types of vehicles. For example, the nodes also may be a number of different unmanned aerial vehicles of different types. Further, a set of unmanned aerial vehicles and a set of manned vehicles may be used. The set of unmanned aerial vehicles is one or more vehicles, and the set of manned vehicles are one or more vehicles in these examples. Generally, a set of vehicles in these examples are a set of one or more vehicles. The nodes may be a set of aircraft and a set of land vehicles.

As another example, the nodes may contain a set of aerial vehicles, a set of water vehicles, and a set of aircraft. Depending on the particular implementation, one of the nodes may even be a stationary node, such as a building containing a radar system. Further, the different illustrative embodiments may be applied to identify vehicles in other locations other than on ground 110. For example, a three dimensional image of a vehicle on water 126 may be constructed and identified.

Figure 2:
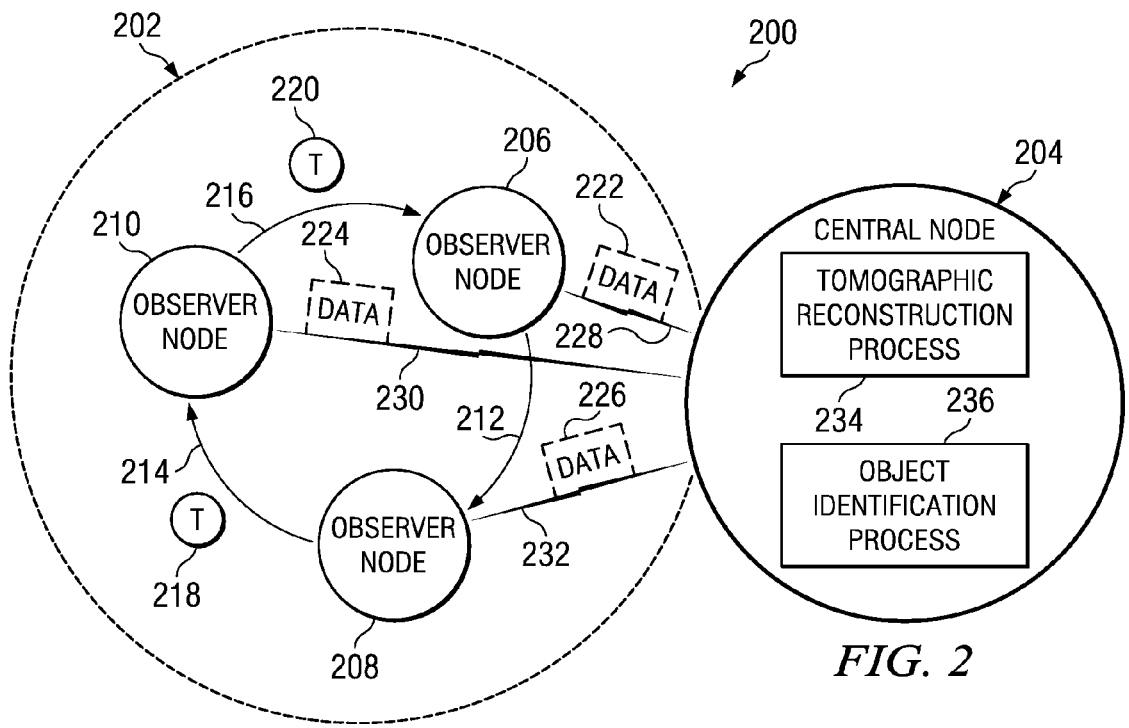
FIG. 2 is a diagram illustrating an imaging system in accordance with an advantageous embodiment.

Turning next to FIG. 2, a diagram illustrating an imaging system is depicted in accordance with an advantageous embodiment. In this example, imaging system 200 includes coordinated network centric data collection system 202 and central node 204. Coordinated network centric data collection system 202 contains observer nodes 206, 208, and 210. In these examples, observer nodes 206, 208, and 210 may take the form of unmanned aerial vehicles 100, 102, and 104 in FIG. 1. Central node 204 may be implemented using aircraft 106 in FIG. 1.

In these examples, observer nodes 206, 208, and 210 communicate with each other using communications links 212, 214, and 216. These communications links are used to transmit tokens, such as tokens 218 and 220. Tokens, such as tokens 218 and 220 are passed between observer nodes 206, 208, and 210 such that each of the observer nodes has access to the tokens generated by the other observer nodes within coordinated network centric data collection system 202.

These tokens are used to pass information between the different observer nodes. Observer nodes 206, 208, and 210 each generate tokens as they collect radar data about an object. Each of these tokens identifies the time and location at which the radar data was collected. In addition, each token also identifies the portion of the radar data collected by the observer node generating the token that is needed to construct the three dimensional image.

The information in these tokens are used by observer nodes 206, 208, and 210 to determine where each observer node should move or travel to collect uncollected portions of radar data needed to generate an image of the object. Radar data 222, 224, and 226 collected by observer nodes 206, 208, and 210 and tokens, such as tokens 218 and 220 are transmitted to central node 204 through communications links 228, 230, and 232 in these examples.

In these examples, radar data 222, 224, and 226 are conditioned and filtered locally by observer nodes 206, 208, and 210 before transmitting the data to central node 204. In other words, radar data 222, 224, and 226 are in a processed form in these examples.

Central node 204 contains tomographic reconstruction process 234, in these examples, and is used to recreate a three dimensional image of the object from the different portions of the radar data collected by observer nodes 206, 208 and 210. Central node 204 also may include object identification process 236. This process identifies the object based on the three dimensional image generated by tomographic reconstruction process 234.

Although tomographic reconstruction process 234 is used by central node 204 to create the three dimensional image of the object from the radar data, other types of processes may be used other than tomographic reconstruction process 234. Any imaging process that may be used to recreate a three dimensional image from data collected for an object at different angles may be used.

The different components illustrated in FIG. 2 are meant as examples and not architectural limitations as to the manner in which the different features of the advantageous embodiments may be implemented. For example, tomographic reconstruction process 234 and object identification process 236 may be implemented as a single process. Alternatively, object identification process 236 may be located on a different node. Also, the number of observer nodes within coordinated network centric data collection system 202 may vary.

Moreover, coordinated network centric data collection system 202 is designed to be both adaptive and self-healing in these examples. In other words, the addition or deletion of an observer within coordinated network centric data collection system 202 does not derogate the overall data collection and reconstruction process.

Further, observer nodes 206, 208, and 210 include processes to produce distributed control to control the movement of each observer node to optimally cover the sampling space required to collect the different portions of the radar data needed to construct a three dimensional image of the object. Also, in the advantageous embodiments, communications links 212, 214, and 216 are designed to use as little bandwidth as possible.

Depending on the particular implementation, central node 204 may project a radar beam with data being collected by the different observer nodes. In yet another advantageous embodiment, central node 204, observer node 206, observer node 208, and observer node 210 may all project radar beams onto the object and may all collect radar data.

Figure 3:
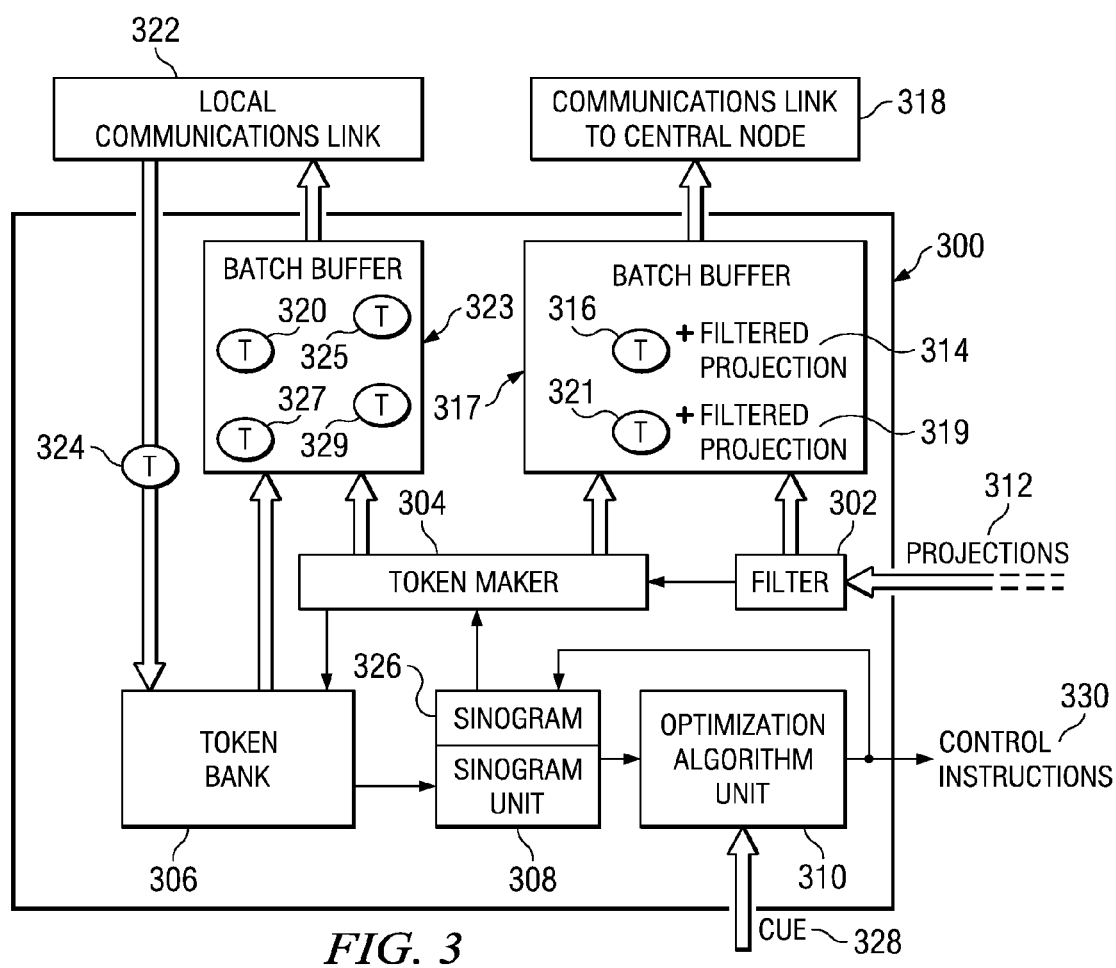
FIG. 3 is a processing unit in accordance with an advantageous embodiment.

Turning now to FIG. 3, a processing unit is depicted in accordance with an advantageous embodiment. In this example, processing unit 300 is an example of a processing unit that may be found in an observer node, such as observer node 206 in FIG. 2.

As depicted, processing unit 300 contains filter 302, token maker 304, token bank 306, sinogram unit 308, and optimization algorithm unit 310. Filter 302 is a local filter located within the observer node. Filter 302 filters radar data collected by processing unit 300 before this radar data is uploaded to a central node for processing. In these examples, a portion of the radar data collected for the object by the processing unit is also referred to as a projection. In this example, filter 302 receives projections 312 and stores filtered projection 314 along with token 316 in batch buffer 317 until the batch is ready to be transmitted to a central node through communications link 318.

In these examples, batch buffer 317 stores multiple tokens and associated filtered projections for transmission. The tokens and filtered projections are grouped in "batches" for transmission to the central node through communications link 318. In this example, filtered projection 314 and associated token 316 along with filtered projection 319 and associated token 321 are stored in batch buffer 317 for transmission to a central node through communications link 318.

In these examples, batch buffer 317 is a component that stores data, such as tokens and filtered projections, prior to the communication or transmission of this data over a communications links, such as communications link 318. Batch buffer 317, in these illustrative examples, provides for matching the data rates between a communications link and a generation of filtered projection 314 by filter 302.

In these examples, token maker 304 generates tokens, such as token 316. Additionally, token maker 304 also generates and stores token 320 in batch buffer 323 along with tokens 325, 327, and 329. In these examples, these tokens are grouped in a batch for transmission to other nodes on local communications link 322 as an asynchronous event. Although two distinct batch buffers are illustrated, batch buffer 317 and 323 may be implemented as a single buffer.

In these illustrative embodiments, a token is generated by token maker 304 after the radar system completes one cycle of data collection that is processed by filter 302. In these examples, a "cycle" refers to the minimum amount of time needed to collect and process one portion of radar data or one projection. In these examples, the processing of the portion of radar data includes conditioning and filtering.

In these examples, tokens 316 and 320 contain an identification of the observer on which processing unit 300 is located, the location of the observer, and a time stamp of when the radar data, projections 312, was collected. Other information, such as sensor operating parameters, also may be included in tokens 316 and 320. The information contained within tokens 316 and 320 may be any information that can be used by the observer nodes to identify what portions of the radar data needed to create a three dimensional image of the object has been collected as well as the locations of other observers for use in determining what portions of the radar data should be collected next.

Local communications link 322, in this example, is a communications link that is used to communicate with the other observers. In these examples, local communications link 322 is a common communications channel in which all of the observers listen. Each observer may serve as a relay station for tokens. In this example, token 316 and token 320 contain the same information generated by token maker 304. Token 316 is intended for use by the central node, while token 320 is intended for use by other observer nodes.

Token bank 306 stores tokens received through local communications link 322. If token 324 contains the same observer identifier as the observer identifier for processing unit 300, a local token in token bank 306 is already updated. If token 324 was not generated by processing unit 300, the token is stored in token bank 306 or replaces an outdated token in token bank 306. More specifically, if the observer identification on the incoming token matches that of one of the tokens deposited in token bank 306, and if the arriving token has a more recent time stamp than the tokens in token bank 306, then the outdated tokens in token bank 306 are removed. The newly arrived tokens are deposited in token bank 306.

Sinogram unit 308 is a specific example of a sampling unit that determines what samples or portions of radar data need to be collected. Sinogram unit 308 uses tokens stored in token bank 306 to generate a pictorial representation of samples in a sampling process for a three dimensional tomographic reconstruction process. Sinogram unit 308 identifies the different portions or projection of the radar data that have been collected by the observer node in which processing unit 300 is located as well as other observer nodes in the coordinated network centric data collection system through the tokens stored in token bank 306. Sinogram 326 is stored within sinogram unit 308 in these examples. Although only a single sinogram, sinogram 326 is illustrated in this figure. Sinogram unit 308 may maintain or store many sinograms, depending on the implementation.

Optimization algorithm unit 310 receives sinogram 326 and cue 328 as inputs to generate control instructions 330. Cue 328 contains information regarding the current location of an object for which radar data is being collected. In these examples, cue 328 is received from the central reconstruction node through communications link 318 in this example. Cue 328 contains information from the centralized node and may include the target location, the estimated size of the target, and the area of uncertainty associated with the cue. Additionally, cue 328 may include an initial sinogram for use by sinogram unit 308 for data collection of the identified target object.

Control instructions 330 are also used by sinogram unit 308 to update the portions of radar data collected for use in reconstructing an image of the object. Sinogram unit 308 may use control instructions 330 to identify the location and direction of the observer node to determine what portions of the radar data have been and are going to be collected by the observer node. The output of control instructions 330 by optimization algorithm unit 310 form a feedback loop into sinogram unit 308 in these examples.

Control instructions 330 include, for example, instructions for flight control and sensor control. The flight control instructions are used to direct the vehicle in which processing unit 300 is located to collect uncollected portions of the radar data needed to generate the three dimensional image of the object. In a similar fashion, control instructions 330 contain sensor control instructions used to control the collection of the radar data by the sensors.

In these examples, the different components illustrated in processing unit 300 are functioning units that may be implemented in different manners. For example, the different components may be implemented as software, hardware, or software and hardware.

Figure 4:
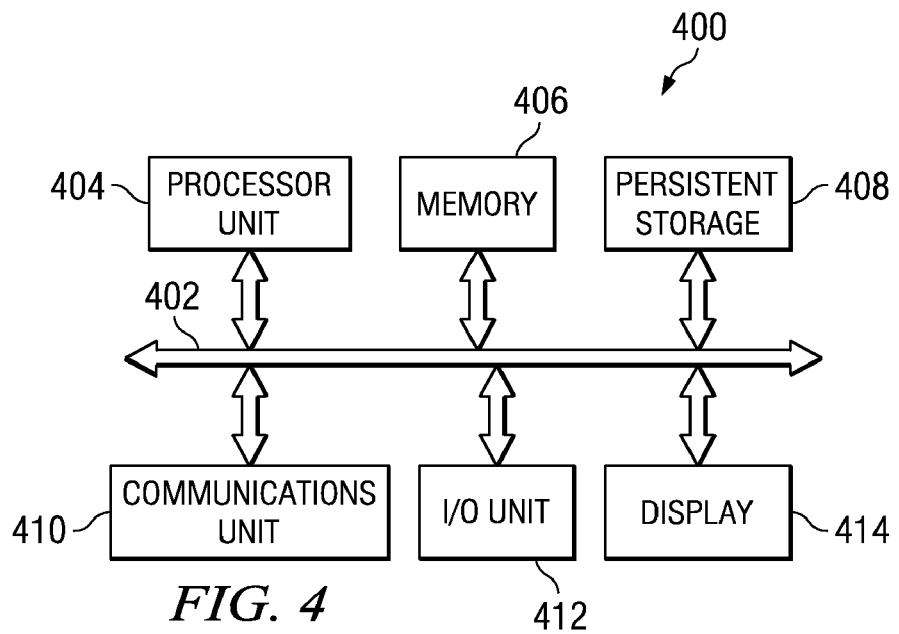
FIG. 4 is a diagram of a data processing system in accordance with an illustrative embodiment.

Turning now to FIG. 4, a diagram of a data processing system is depicted in accordance with an illustrative embodiment. Data processing system 400 is an example of a data processing system, which may be used to implement the processing resources in central node 204 in FIG. 2. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. Memory 406, in these examples, may be, for example, a random access memory. Persistent storage 408 may take various forms, depending on the particular implementation. For example, persistent storage 408 may be, for example, a hard drive, a flash memory, a rewritable optical disk, a rewritable magnetic tape, or some combination of the above.

Communications unit 410, in these examples, provides for communications with other data processing systems or devices. In these examples, communications unit 410 is a network interface card. I/O unit 412 allows for input and output of data with other devices that may be connected to data processing system 400. For example, I/O unit 412 may provide a connection for user input through a keyboard and mouse. Further, I/O unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406.

Figure 5:
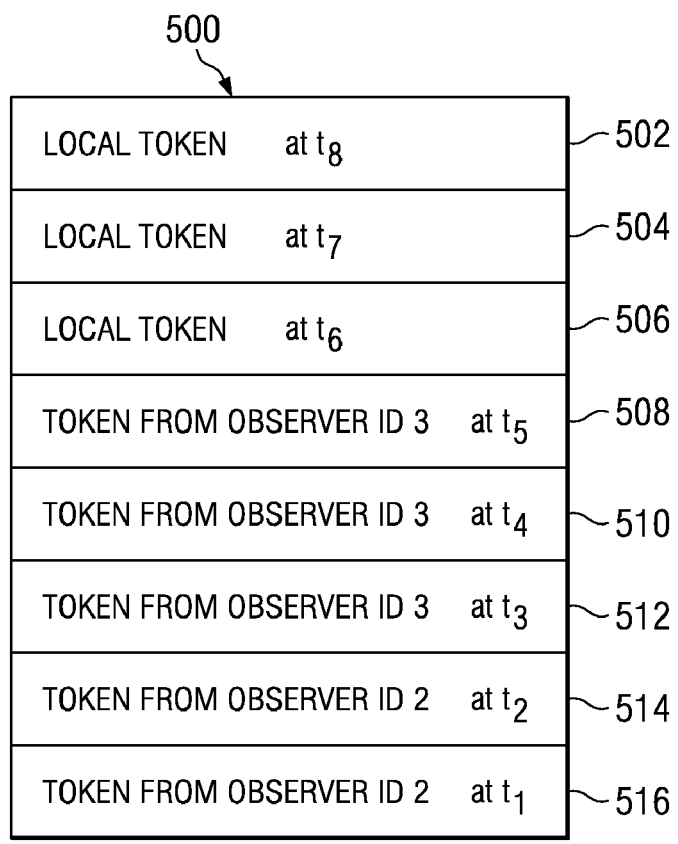
FIG. 5 is a diagram illustrating a token bank in accordance with an advantageous embodiment.

Turning now to FIG. 5, a diagram illustrating a token bank is depicted in accordance with an advantageous embodiment. In this example, token bank 500 is an example of token bank 306 in FIG. 3.

Token bank 500 contains local token 502, local token 504, and local token 506. Additionally, token bank 500 also contains token 508, token 510, token 512, token 514, and token 516. Local tokens 502, 504, and 506 contain information for the observer node in which token bank 500 is located. These local tokens are generated each time the processing unit in the observer node generates a token for transmission onto a local communications link.

Each of these local tokens are tokens generated on the node on which token bank 500 is located. Local token 502, local token 504 and local token 506, however, are generated at different times in these examples.

Tokens 508, 510, 512, 514 and 516 are tokens received from the local communications link and have been generated by other observer nodes. These tokens are stored within token bank 500 for use by a sinogram unit to update a sinogram to identify portions of the radar data that have been collected as well as portions of the radar data that have not been collected. In these examples, the different portions are referred to as projections.

In these examples, the tokens illustrated in token bank 500 are examples of the content sent during a batch operation. In other words, tokens, in these illustrative examples, are sent in groups or batches. Further, in sending tokens, tokens may be present having the same observer identification but containing information at different times. Although token bank 500 is illustrated as storing eight tokens, token bank 500 may store any number of tokens depending on the particular implementation.

Turning now to FIG. 6, a diagram of a token is depicted in accordance with an advantageous embodiment. In this example, token 600 is an example of the token found in token bank 500 in FIG. 5.

Token 600, in these examples, contain fields used to identify what radar data has been collected and where the observer node was located. The information in token 600 also may be used to determine the heading of different observer nodes as well as pass command from the central node to the observer nodes.

In these example, token 600 includes token ID 602, observer ID 604, token batch ID 606, batch time stamp 608, observer position and attitude time stamp 610, observer elevation angle 612, observer heading angle 614, observer range to center 616, observer pitch angle 618, observer yaw angle 620, radar mounting lever arm 622, radar mounting lever arm 624, radar mounting lever arm 626, radar data collection time stamp 628, radar elevation pointing angle 630, radar azimuth pointing angle 632, radar return range 634, radar frequency 636, radar frequency modulation rate 638, radar coherent detection dwell time 640, radar moving target detection x-velocity 642, radar moving target detection y-velocity 644, radar moving target detection z-velocity 646, central node command 648, central node command time stamp 650, central node or object position x 652, central node or object position y 654, and central node or object position z 656. The information in these fields depends on whether the content of central node command 648 is a central node position update or a target position update.

Token ID 602 is used to identify the token. In these examples, token ID 602 is a unique identifier. Observer ID 604 is used to identify the observer node generating the token. Token batch ID 606 is an identifier that identifies a batch of tokens that are transmitted together. Batch time stamp 608 is an identifier of when the tokens in the batch are ready to be transmitted by the observer node. Observer position and attitude time stamp 610 is used to identify the time at which the observer node collected a particular portion of the radar data at a particular position and attitude. Radar data collection time stamp 628 identifies the time when the radar data was collected.

Radar return range 634 identifies the radar range from which data is being collected to generate a three dimensional image. Radar frequency 636 is the frequency of the radar system. Radar frequency 636 identifies the carrier frequency of the electromagnetic radiation beam being emitted by the radar system. Radar frequency modulation rate 638 is the rate of maximum frequency deviation from the carrier frequency of radar frequency 636. Radar coherent detection dwell time 640 is the time taken to perform an integration in the coherent detector of the radar system. In these examples, radar frequency modulation rate 638 and radar coherent detection dwell time 640 are used to determine the bandwidth of the reconstructed image.

Radar moving target detection x-velocity 642, radar moving target detection y-velocity 644, and radar moving target detection z-velocity 646 provide information as to the velocity of the target. The target may or may not be moving.

Central node command 648 is a field in which a command may be placed by a central node for use by an observer node. Central node command time stamp 650 identifies the time at which the command was issued by the observer node.

Central node or object position x 652, central node or object position y 654, and central node or object position z 656 provide an indication or idea of where the central node or the target is located. The information in these fields depends on whether the content of central node command 648 is a central node position update or a target position update. In other words, these positions are coordinates for a location of either the central node or the target. The coordinates do not provide an exact location of either the central node or the target and may contain some uncertainty in these examples. For example, the uncertainty may be plus or minus five meters for a particular coordinate. Additional information used by the central node to identify the location include x position sigma 658, y position sigma 660, and z position sigma 662. Additional information includes velocity information, such as position x-velocity 664, position y-velocity 666, and position z-velocity 668.

Observer elevation angle 612, observer heading angle 614, observer range to center 616, observer pitch angle 618, and observer yaw angle 620 contains information used to identify the location and pose (orientation) of the observer node. Radar mounting lever arm 622, radar mounting lever arm 624, and radar mounting lever arm 626 contain information used to identify the positioning of the sensor in the observer node. Radar elevation pointing angle 630 and radar azimuth pointing angle 632 identify the direction of radar returns.

The different fields illustrated in token 600 are only provided as illustrative examples. Other types of information may be used in addition to, or in place of, the information shown in the different fields. Any information may be used in token 600 for identifying information about collected radar data.

Figure 7:
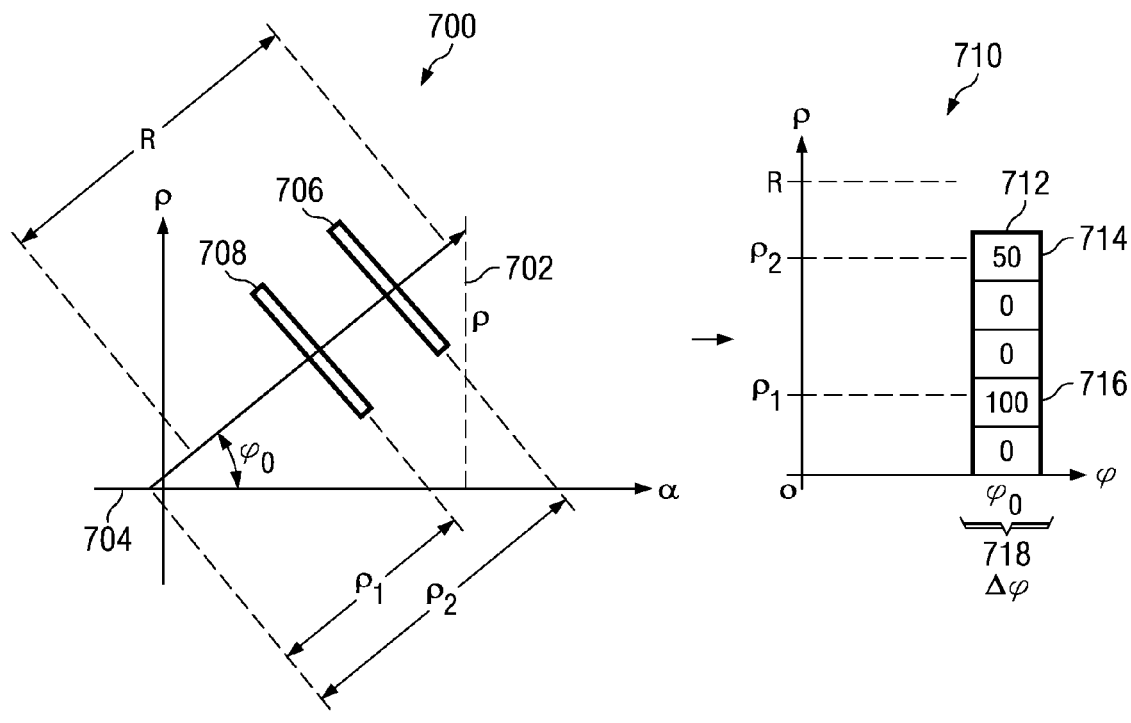
FIG. 7 is a diagram illustrating the conversion of a position of reflective radar data collected by an observer node and range of radar returns in a coordinate system representing locations to a sampling point in a sinogram in accordance with an advantageous embodiment.

With reference now to FIG. 7, a diagram illustrating the conversion of a position of reflective radar data collected by an observer node and range of radar returns in a coordinate system representing locations to a sampling point in a sinogram is depicted in accordance with an advantageous embodiment. A sinogram is a visual representation of a Radon transformation. In these examples, the sinograms define the radar data that needs to be collected. The sinogram provides a position from which an observer node should collect radar data. This type of graph is referred to as a sinogram because as the observer moves in a three dimensional space and the radar on the observer points at different angles, the loci of sampling points resembles a family of curves resembling sinusoidal functions. Radar projection values at sampling points are considered a signature for an object's cross-sections in these examples. The different portions of radar data collected by the observers correspond to a function of three independent variables in a three dimensional sinogram.

Still, with reference to FIG. 7, graph 700 illustrates the location of observer node 702. Observer node 702 has a distance of R from point 704. Point 704, may be, for example, the origin of the coordinate system or the location of the target object. Surfaces 706 and 708 are identifications of surfaces that are normal to the line from point 704 to observer node 702. $\rho 1$ represents the distance from point 704 to surface 708 on line R, while $\rho 2$ represents the distance from point 704 to surface 706 normal to line R.

In this example, only two dimensions, the z and x axis are shown for purposes of illustration. In actual usage, three dimensions are employed. The position of reflective radar data collected by observer node 702 in graph 700 may be translated into a region in a sinogram as shown in graph 710. As can be seen, graph 710 is a sinogram that shows the location of sampling points along a single bar at which point 712 represents the point at which observer 702 is located in graph 700. The value within range bin 714 represents the data that the observer should collect corresponding to graph 700 at a view angle $\phi_0$. The value at point 716 within range bin 714 is a value corresponding to a write or return at $\rho 1$, which corresponds to surface 708 in graph 700. $\Delta\phi$ 718 represents the resolution, which is determined by the width of the radar beam in these examples.

Figure 8:
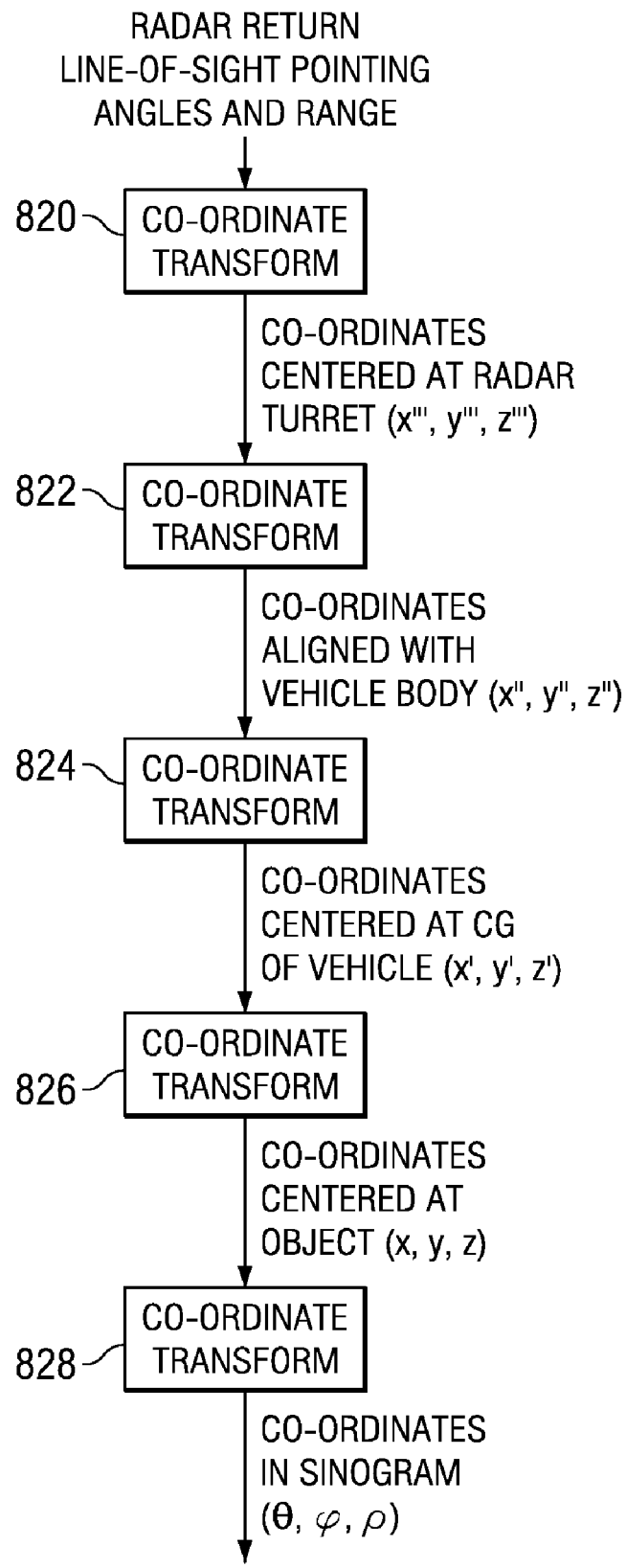
FIG. 8 is a diagram illustrating different transforms used to transform particular line of sight radar data to a sampling point in a three dimensional sinogram in accordance with an advantageous embodiment.

Turning now to FIG. 8, a diagram illustrating different transforms used to transform particular line of sight radar data to a sampling point in a three dimensional sinogram is depicted in accordance with an advantageous embodiment. The different coordinate transforms, in these examples, are used to transform data from graph 700 to the form shown in graph 710 in FIG. 7.

A three dimensional sinogram may be viewed as a function in a three dimensional coordinate system with three axis points $(\theta,\phi,\rho)$, where $\theta$ is the elevation angle and $\phi$ is the azimuth angle of an observation, in a coordinate system center at the object to be reconstructed. The definition of $\rho$ depends on whether the system is a reflection tomography system or a transmission tomography system.

For reflection tomography, $\rho$ is the range of the reflected electromagnetic energy to the center of coordinate system. For transmission tomography, $\rho$ is the normal distance from the origin of coordinate system to the line of transmission.

From the perspective of a reconstruction algorithm, the value at $(\theta,\phi,\rho)$ is the Radon transform of a three dimensional image when viewed at an elevation angle $\theta$ and azimuth angle $\phi$. In these examples, data $(\theta,\phi,\rho)$ represents the Radon transform of a three dimensional image f (x,y,z). For reflection tomography, data $(\theta,\phi,\rho)$ is the radar return when the observer is at $(\theta,\phi)$ and the range of the return, with respect to the center of coordinate system, is $\rho$. For coherent detection, data $(\theta,\phi,\rho)$ is a complex number consisting of both the in phase and quadrature phase components.

Still, with reference to FIG. 8, coordinate transform 820 transform the coordinate of radar data from the line of sight coordinate system to one that is centered at the radar turret gimbal. In these examples, the radar turret gimbal is the point of rotation for the radar turret. The coordinates centered at the radar turret gimbal are x''', y''' and z''' coordinates in these examples. Next, coordinate transform 822 is applied to this data to translate these coordinates into one aligned with the body of the vehicle in which the radar unit is mounted. These coordinates are x'', y'' and z'' values.

Then, this information is transformed using coordinate transform 824, which is used to shift the coordinate data generated by coordinate transform 822 to align with the center of gravity of the vehicle. In other words, the output or coordinate transform 824 is a coordinate that is centered at the center of gravity of the vehicle. In these examples, this information is x', y' and z' coordinates.

In turn, this output is transformed by coordinate transform 826 to translate the data coordinates to a coordinate system that is centered at a point on the ground, such as the object location. The output from coordinate transform 826 is processed using coordinate transform 828. Coordinate transform 828 generates a coordinate for a three dimensional sinogram. The choice of the coordinate transform used in transform 828 depends on the pose and velocity hypothesis in these examples. The coordinates in a sinogram is represented by $\theta$, $\phi$ and $\rho$ in these examples.

Figure 9:
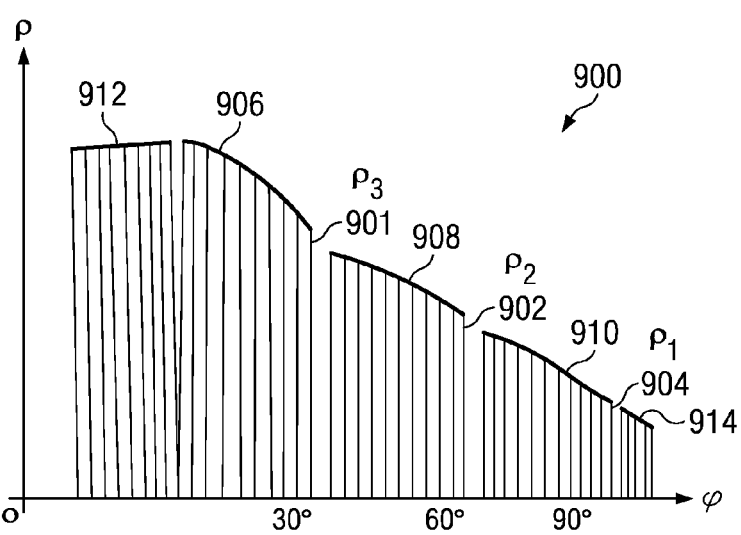
FIG. 9 is a diagram illustrating a sinogram in accordance with an advantageous embodiment.

Turning now to FIG. 9, a diagram illustrating a sinogram is depicted in accordance with an advantageous embodiment. In this example, sinogram 900 is an example of a sinogram that may be maintained by sinogram unit 308 in FIG. 3. In this example, points 901, 902, and 904 identify three observer nodes collecting radar data. Sections 906, 908, and 910 identify portions of radar data or projections collected by the different observers in these examples. Sections 912 and 914 identify radar data that still needs to be collected to complete the collection of radar data needed to create a three dimensional image of an object.

Figure 10:
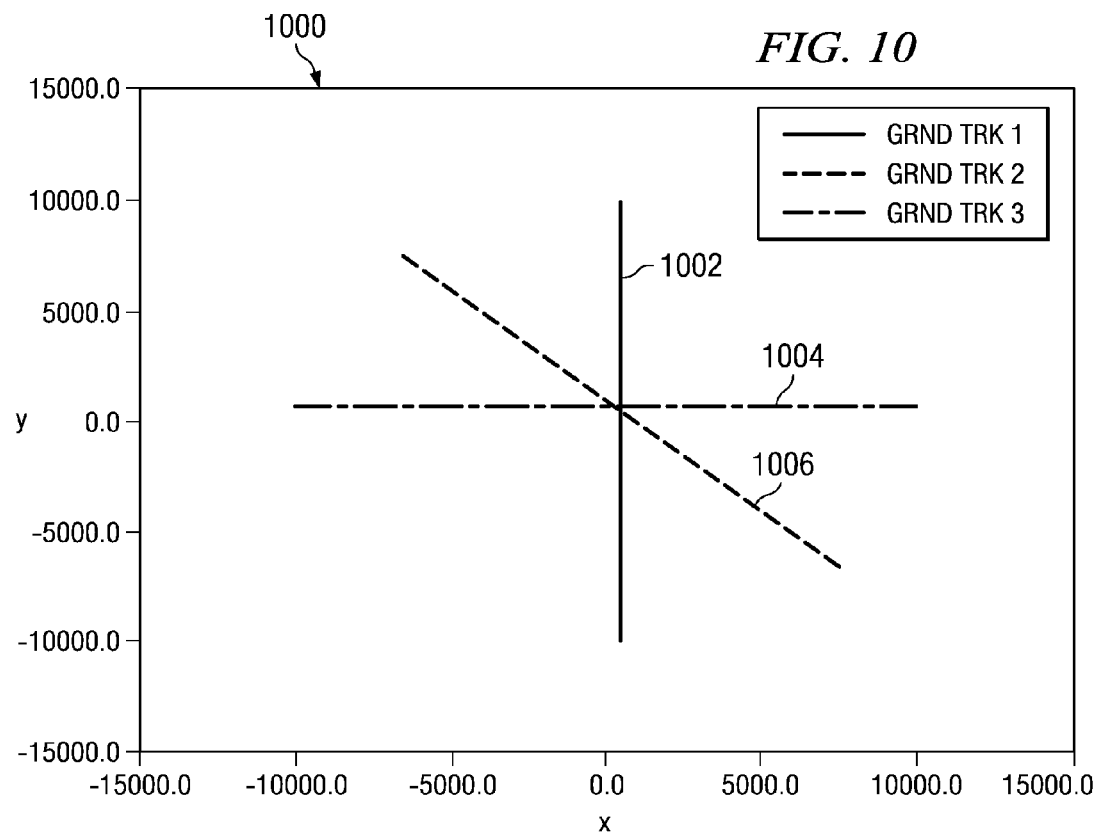
FIGS. 10-13 are diagrams illustrating the use of a sinogram for collaborative coordinated data collection among multiple servers in accordance with an advantageous embodiment.
Figure 11:
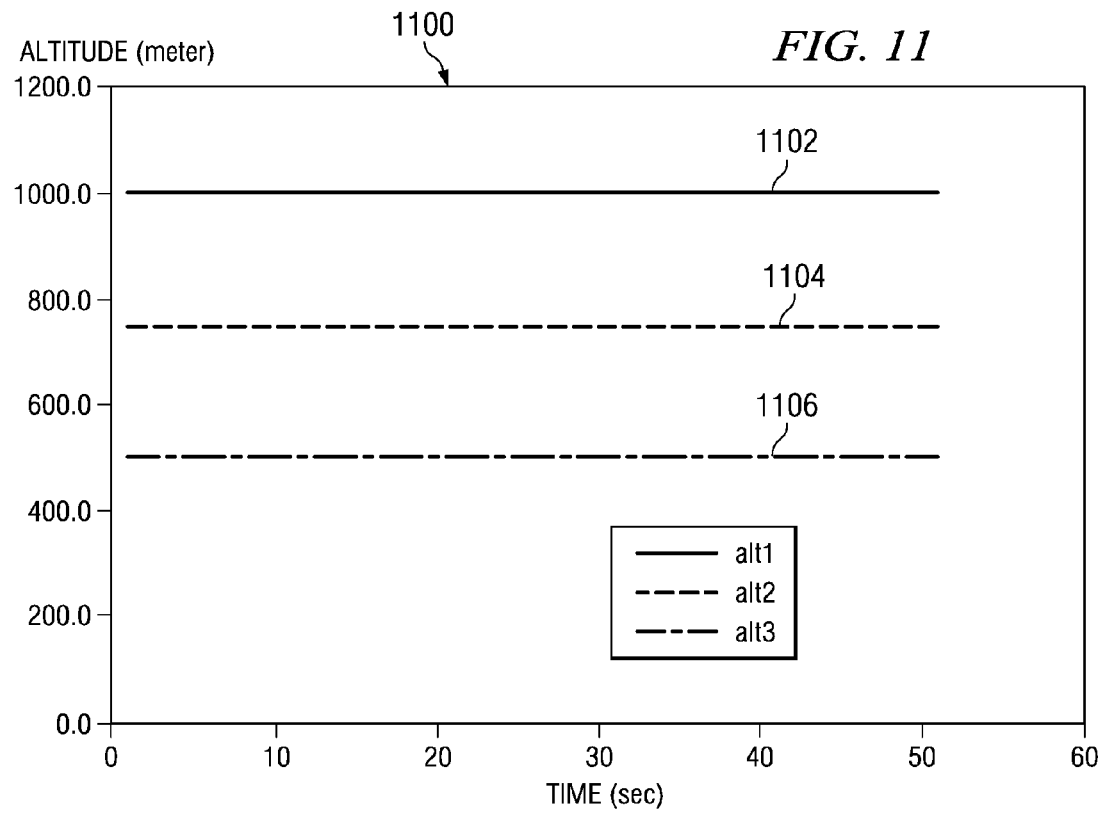

Turning now to FIGS. 10-13, diagrams illustrating the use of a sinogram for collaborative coordinated data collection among multiple servers is depicted in accordance with an advantageous embodiment. In FIG. 10, graph 1000 illustrates a "bird's eye" view of the coordinate tracks of three airborne observers. The airborne observers are shown flying or moving along straight paths as indicated by lines 1002, 1004, and 1006 in graph 1000. Graph 1100 in FIG. 11 is an illustration of an altitude profile. Graph 1100 illustrates the altitude plot of vehicles flying at different altitudes.

Figure 12:
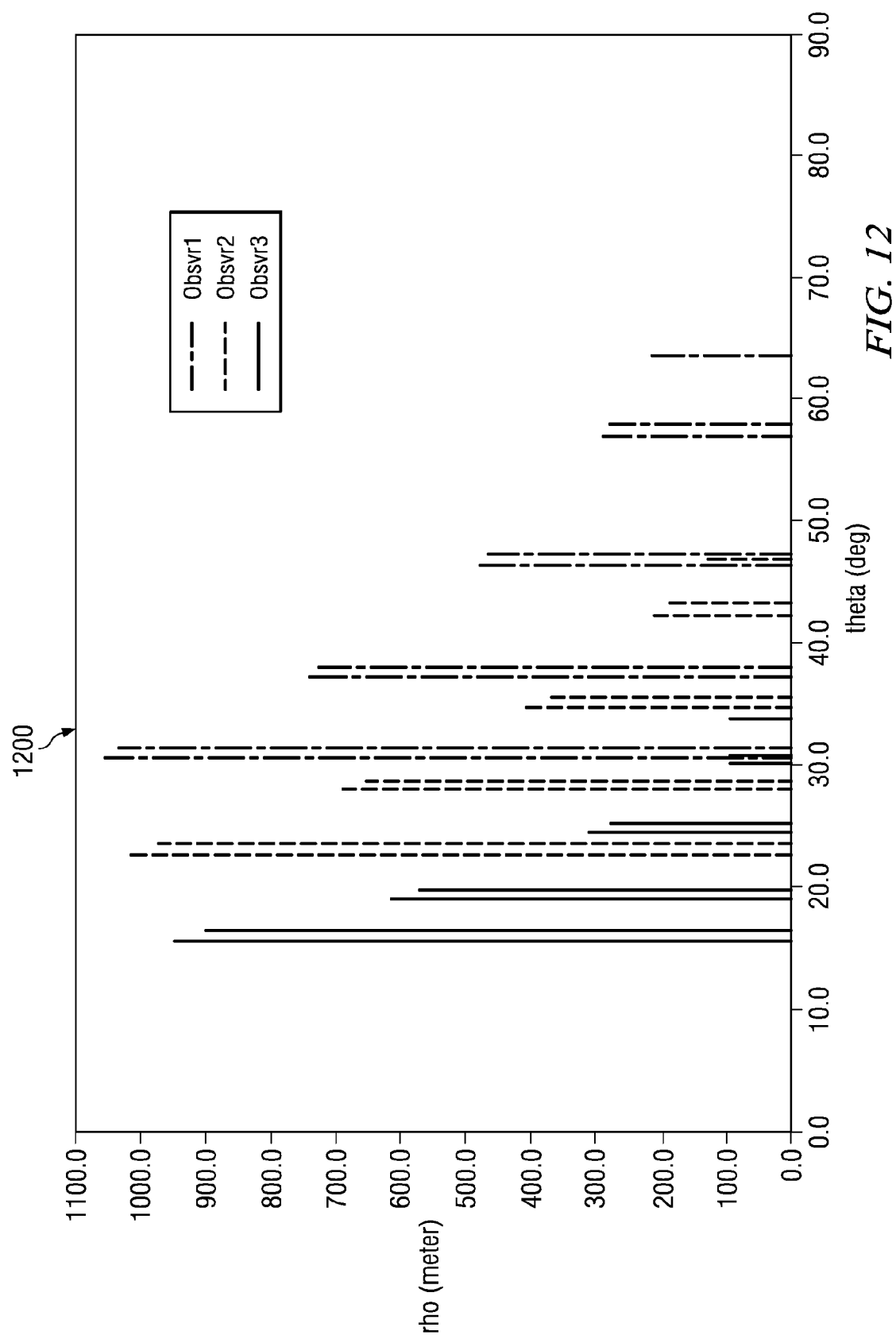
Figure 13:
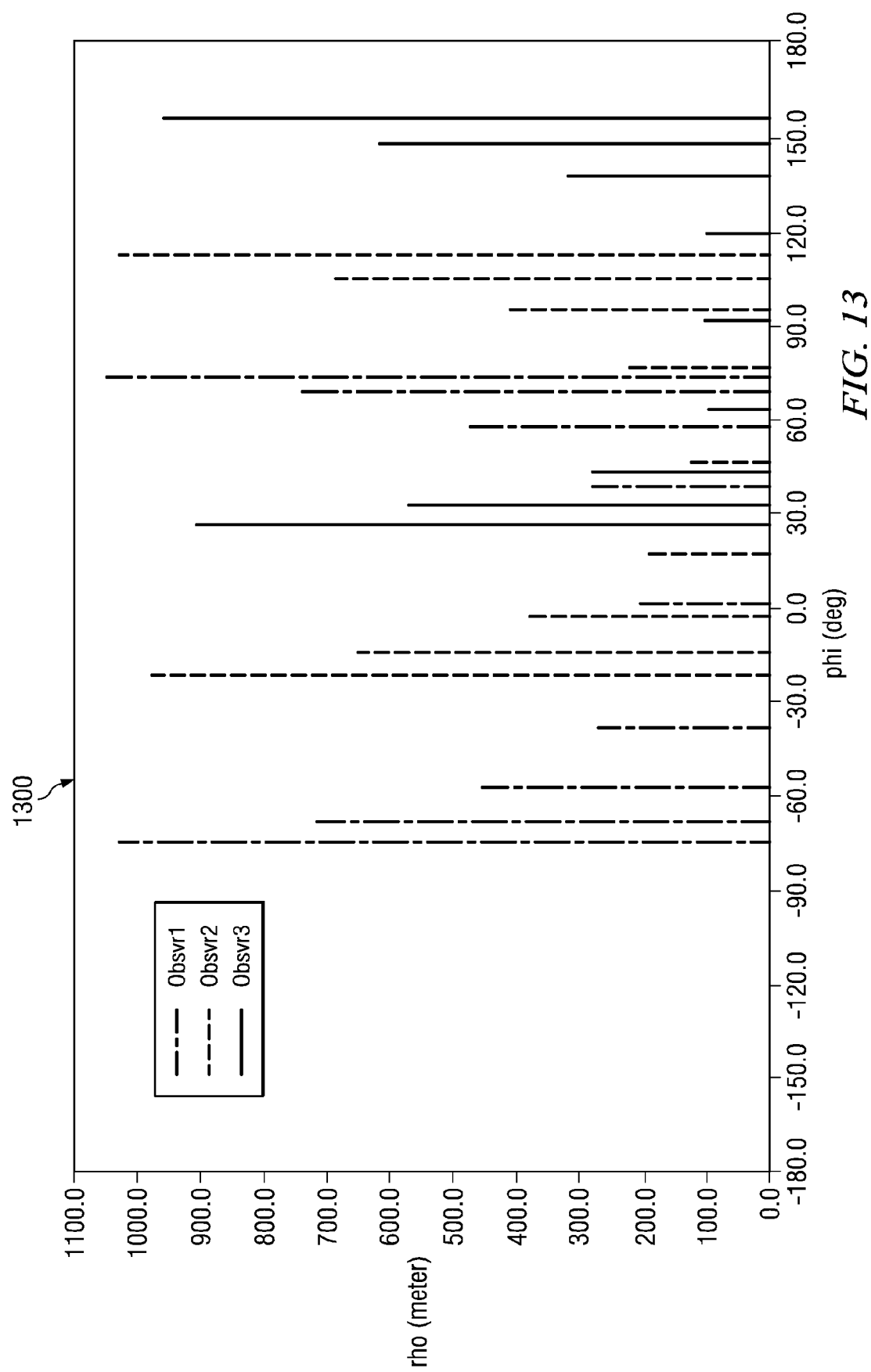

Three vehicles are shown at three different altitudes as illustrated by lines 1102, 1104, and 1106 in graph 1100. Graphs 1200 in FIG. 12 and graph 1300 in FIG. 13 illustrate distributions of sampling points within a sinogram space $(\theta,\phi,\rho)$ as observers collect radar data at a rate limited by the processing time of the coherent detection method. In particular, graph 1200 in FIG. 12 illustrates a plot of p as a function $\theta$, while graph 1300 in FIG. 13 illustrates a plot of $\rho$ as a function of $\phi$. These plots in graphs 1200 and 1300 maybe viewed as projections of all sampling points along $\phi$ and $\theta$.

The distribution of these data sampling points would have been highly sparse and non-uniform, if only one observer was present. In other words, multiple observers collect data simultaneously, in a coordinated manner, making it feasible to reconstruct a target object that is constantly moving in these examples. The distribution of the sampling points depends on the flight profile of each observer. The goal is to get as uniformly and as densely distributed sampling points as possible, in order to achieve a meaningful three dimensional reconstruction. This is the basis for the optimal flight path for processor 310 in FIG. 3.

Many different ways are present to find the optimal solution to this problem. One example is to perform an exhaustive search, by first varying the flight profiles of all the observers, and then measure the average sampling distance between all the sampling points. The combination that gives the minimum average distance between sampling points with the shortest time will be selected to generate the flight control instructions to each observer in these examples.

Figure 14:
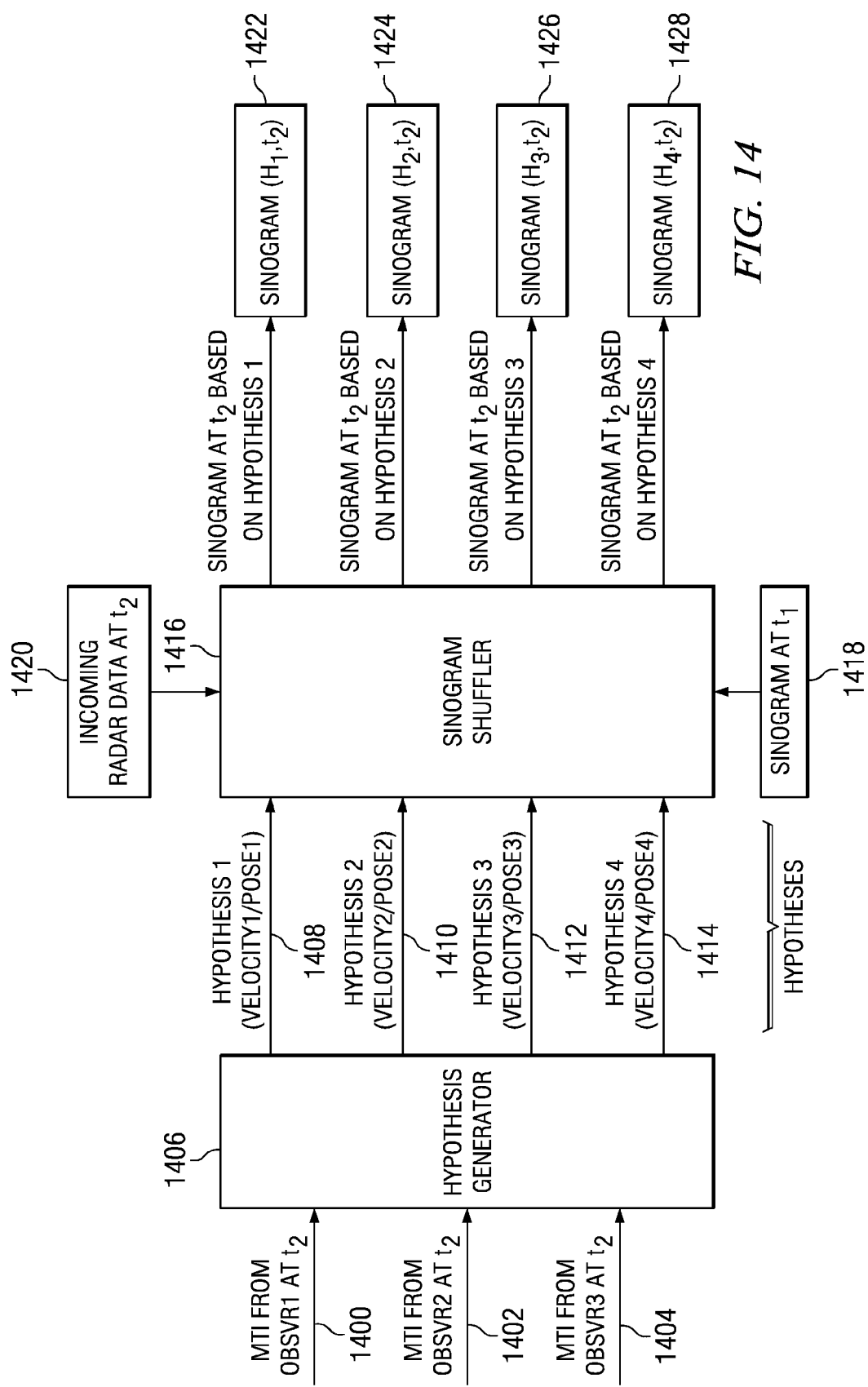
FIG. 14 is a diagram illustrating updating sinograms based on target movement in accordance with an advantageous embodiment.

Turning now to FIG. 14, a diagram illustrating updating sinograms based on target movement is depicted in accordance with an advantageous embodiment. In this example, the different components illustrated in FIG. 14 may be implemented in a central node. Of course, depending on the particular implementation, some or all of these functions could be distributed to the observer nodes.

In this example, moving target indicators 1400, 1402, and 1404 are received from different observer nodes. In these examples, the moving target indicators include a location of the target as well as the velocity and vector of the target. This information is for a time t2 in these examples. This information is used by hypothesis generator 1406 to predict several locations of where the target object should be at for time t2.

Sinogram shuffler 1416 uses the predicted locations generated by hypothesis generator 1406 and current sinogram 1418 to generate new sinograms. In this example, hypotheses 1408, 1410, 1412, and 1414 are generated by hypothesis generator 1406. These different hypotheses contain different velocities and poses for the object based on the inputs into hypothesis generator 1406.

In turn, hypothesis 1408, 1410, 1412, and 1414 are used by sinogram shuffler 1416 along with sinogram 1418 and incoming radar data 1420 to generate sinograms based on the hypotheses. In these examples, sinogram 1418 is the sinogram present prior to receiving target indicators 1400, 1402, and 1404. Sinograms 1422, 1424, 1426, and 1428 are based on the different hypotheses. Sinogram shuffling unit 1410 "shuffles" or rearranges the projection data to rearrange the sampling points based on the movement of the object.

Figure 15:
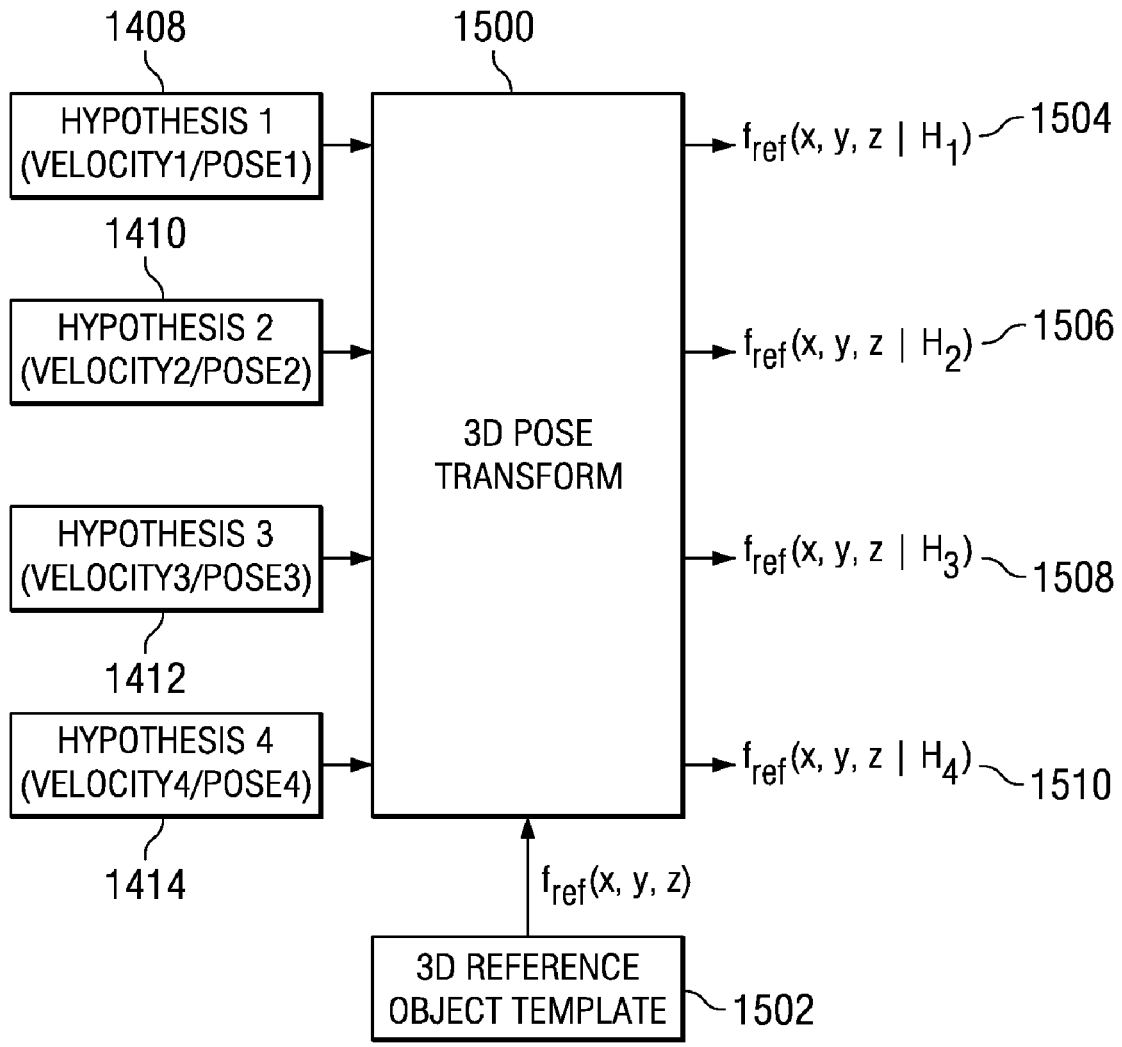
FIG. 15 is a diagram illustrating three dimensional templates at different poses in accordance with an advantageous embodiment.

With reference now to FIG. 15, a diagram illustrated three dimensional templates at different poses is depicted in accordance with an advantageous embodiment. In this example, three dimensional pose transform 1500 applies three dimensional coordinate transforms to three dimensional reference object template 1502 based on hypotheses 1408, 1410, 1412, and 1414 generated by hypothesis generator 1406 in FIG. 14. Three dimensional pose transform 1500 generates object reference templates 1504, 1506, 1508, and 1510. Each of these three dimensional reference object templates has a different pose based on the hypotheses input into three dimensional pose transform 1500.

Figure 16:
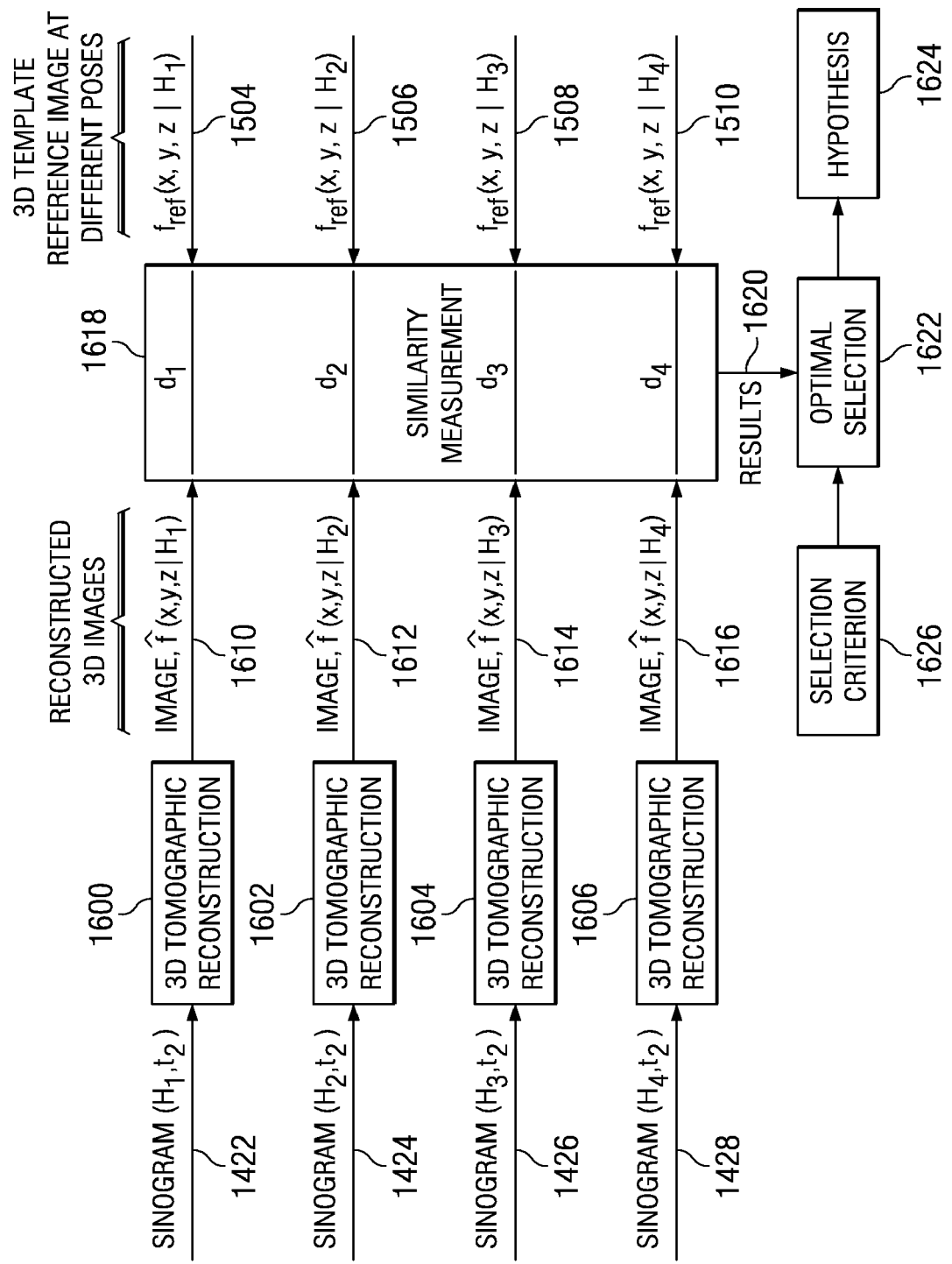
FIG. 16 is a diagram illustrating reconstruction of three dimensional images from different hypotheses in accordance with an advantageous embodiment.

Turning now to FIG. 16, a diagram illustrating reconstruction of three dimensional images from different hypotheses is depicted in accordance with an advantageous embodiment. In this example, sinograms 1422, 1424, 1426, and 1428 are processed using three dimensional tomographic reconstruction processes 1600, 1602, 1604, and 1606.

In this example, four different poses of the referenced object are generated. These three dimensional tomographic reconstruction processes generate reconstructed three dimensional images 1610, 1612, 1614, and 1616. Similarity measurement unit 1618 uses both reconstructed three dimensional images 1610, 1612, 1614, and 1616 along with three dimensional reference templates at different poses 1504, 1506, 1508, and 1510 from FIG. 15 as inputs. These inputs are used to make similarity measurements based on the four different hypotheses. These different measurements are output in the form of results 1620 and used by optimal selection unit 1622 to select a particular hypothesis. Hypothesis 1624 is selected using results 1620 as compared with selection criteria 1626 in these examples.

Many different mathematical models are available for measuring the similarity between two three dimensional images. One example of such a method is to compare the image values at each voxel location, and record the difference at each voxel for all the voxel locations in the three dimensional image, as shown in the following: $\Delta f(X_i,Y_j,Z_k|H_m) = f(X_i,Y_j,Z_k|H_m) - f(X_i,Y_j,Z_k|H_m)$, for m equals 1 to the total number of hypotheses, for all the i, j and k in the three dimensional image.

Optimal selection unit 1622 selects which pair of the reconstructed and reference images most resemble each other, based on a set of selection criterion. One example is to select a pair that has the minimum mean square error (MSE). One example of evaluating MSE is: MSE $(H_m) = \Sigma_{for\ all\ i} \Sigma_{for\ all\ j} \Sigma_{for\ all\ k} |\Delta f(X_i,Y_j,Z_k)|^2$, for all m. The one hypothesis that results in the smallest MSE is selected as the best hypothesis.

Figure 17:
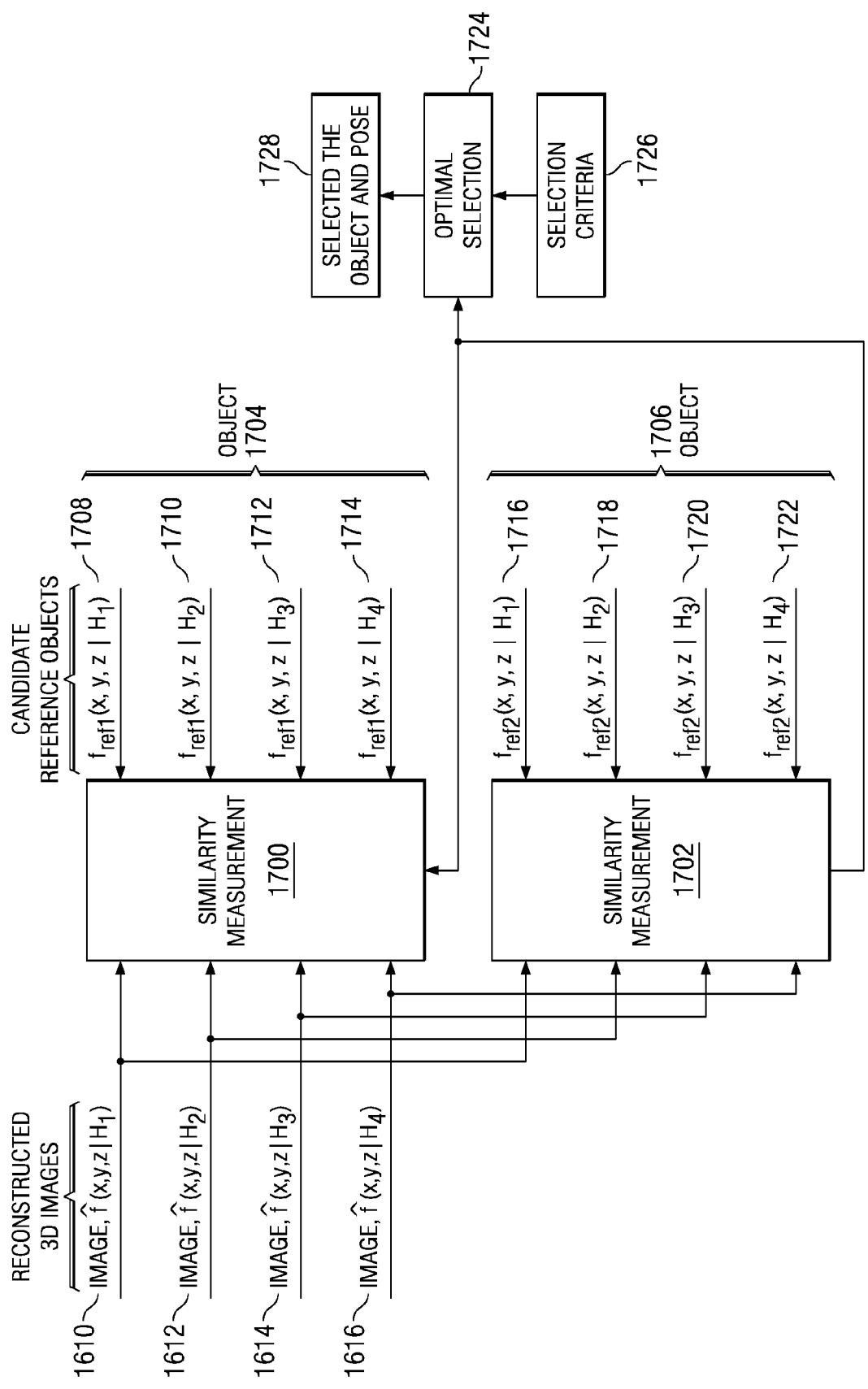
FIG. 17 is a diagram illustrating a selection of an object through multiple reference object templates in accordance with an advantageous embodiment.

Turning now to FIG. 17, a diagram illustrating a selection of an object through multiple reference object templates is depicted in accordance with an advantageous embodiment. In this illustrative example, two candidate template references of an object are being tracked. Similarity measurement 1700 and similarity measurement 1702 are used as inputs into these functions along with reconstructed three dimensional images in the form of three dimensional images 1610, 1612, 1614 and 1616. Object 1704 has candidate reference objects at four different poses, poses 1708, 1710, 1712 and 1714. Object 1706 has candidate reference objects at four different poses, poses 1716, 1718, 1720 and 1722. The outputs from similarity measurement 1700 and similarity measurement 1702 are used by optimal selection 1724 to select a best match of both the object and pose using selection criteria 1726 to form selected object and pose 1728. In these examples, the best match is between both the object velocity and object pose for object 1704 and object 1706.

Figure 18:
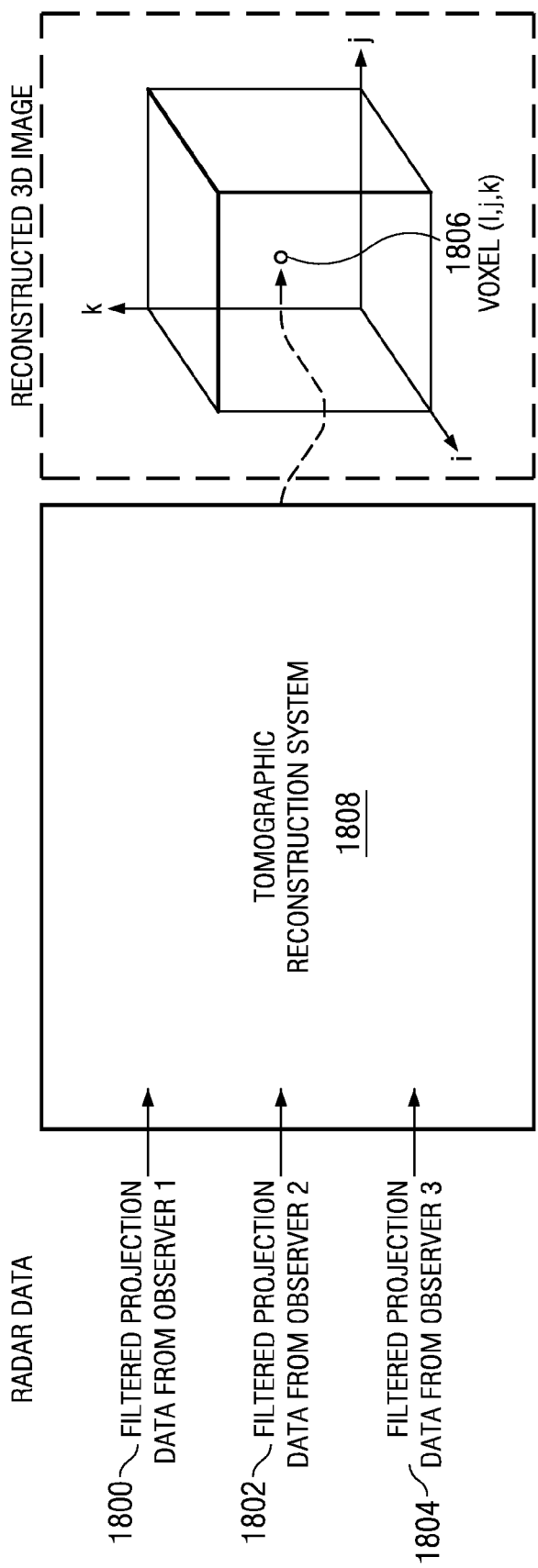
FIG. 18 is a diagram illustrating a reconstruction of a three dimensional image from radar data in accordance with an advantageous embodiment.

Turning now to FIG. 18, a diagram illustrating a reconstruction of a three dimensional image from radar data is depicted in accordance with an advantageous embodiment. In these examples, radar data 1800, 1802, and 1804 are examples of portions of radar data needed to reconstruct the three dimensional image. Radar data 1800, 1802, and 1804 are portions of radar data obtained from observer nodes. In this example, the data is used to construct voxel 1806, which is a volume element. Tomographic reconstruction system 1808 is used to combine radar data 1800, 1802, and 1804 to form voxel 1806.

Voxel 1806 is an acronym for "volume element". Voxel 1806 has three dimensional location indexes (i, j, k) and a value associated with this location. Multiple voxels are used to recreate the image of the object. Depending on the object that has been selected or the resolution for the three dimensional image, different numbers of voxels may be used to recreate the three dimensional image of the object. Hundreds, thousands, or millions of voxels may be used depending on the implementation.

In these examples, the positions of sampling points in the three dimensional sinogram are used for flight control of the observers. Therefore, the sinogram that is on board each observer only need to have the loci of sampling points. The data values (radar projection data), at these sampling points are used to reconstruct a three dimensional image.

The sinogram on the central reconstruction node may have both the loci of sampling points and the radar data at each of these sampling points. Once the three dimensional sinogram is populated with radar projection data at a high enough sampling rate, there are many different methods that can be used to reconstruct a three dimensional images. One example is the "filtered back projection" method, as described below.

In these examples, radar data 1800, 1802, and 1804 are locally filtered on each observer prior to being processed by tomographic reconstruction system 1008.

If some data cannot be captured, interpolation or extraction can be used to identify or recreate the uncaptured data. The inability to capture data may be caused by the target object being obscured briefly or non-contiguous samples being defined in the sinogram.

Figure 19:
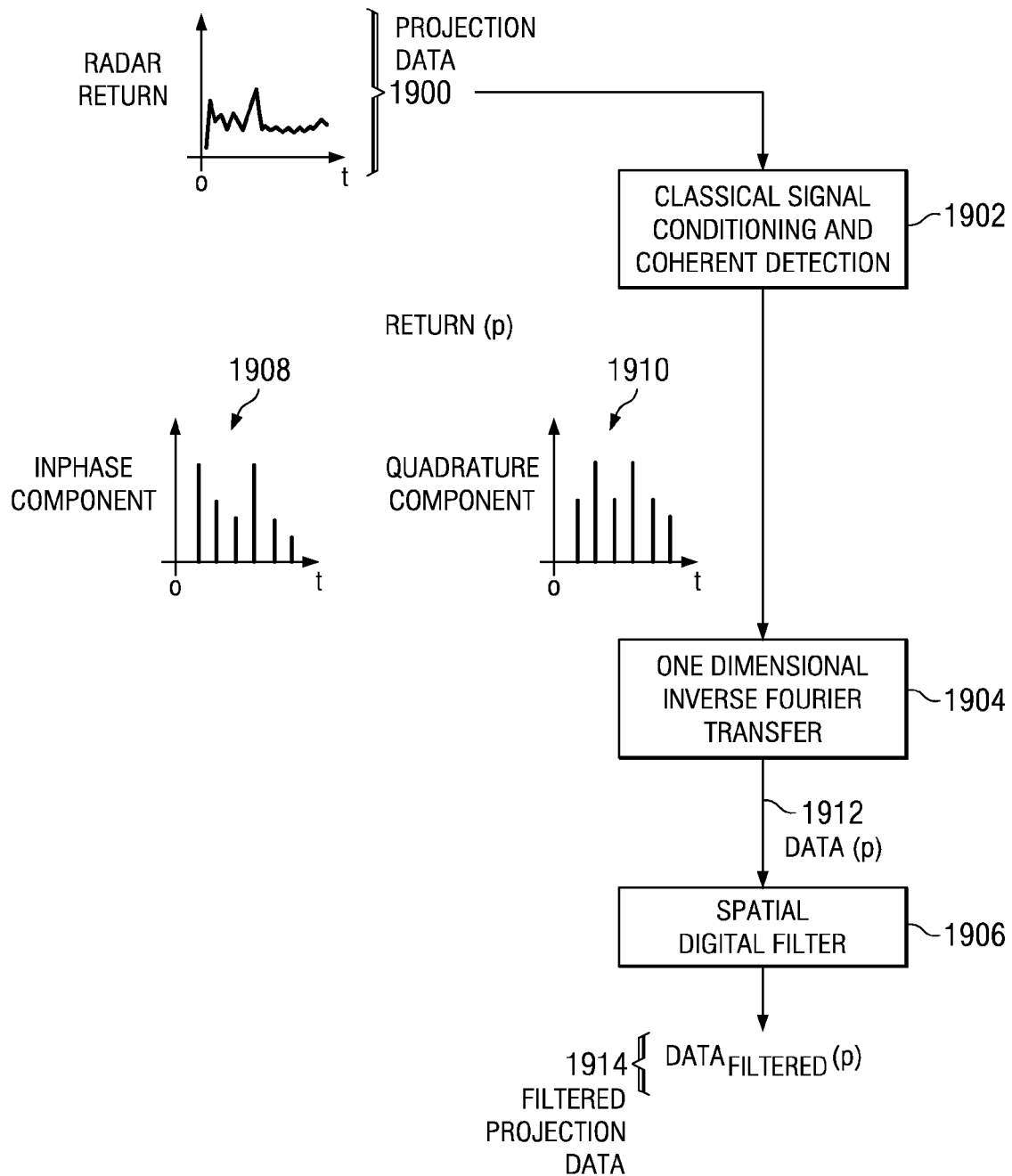
FIG. 19 is a diagram illustrating the filtering of projection data in accordance with an advantageous embodiment.

Turning now to FIG. 19, a diagram illustrating the filtering of projection data is depicted in accordance with an advantageous embodiment. The filtering, in these examples, may be performed using a filter, such as filter 302 in FIG. 3. In this example, projection data 1900 is an example of coherent projection data at different ranges along a line of sight. In particular, projection data 1900 is the data from the radar return or data detected from a radar beam being projected onto an object.

In this example, projection data 1900 is radar data that is filtered using classical signal conditioning and coherent detection unit 1902, one dimensional inverse fourier transform unit 1904, and digital spatial filter 1906. Projection data 1900 is processed using classical signal conditioning and coherent detection unit 1902 to generate inphase component 1908 and quadrature component 1910. These components from a complex number.

This complex coherent data may be processed by one dimensional inverse fourier transform unit 1904 to form data 1912. Data $(\rho)$ is one dimensional inverse fourier transform of the complex coherent radar projection data. Data 1912 is then filtered using spatial digital filter 1906. In this example, the filter is defined as follows: $\text{Data}_{filtered}(\rho) = \Sigma_{over\ all\ i}\ h\ (\rho - \rho_i)$ data $(\rho_i)$, where h $(\rho)$ is a modified version of filter g $(\rho)$, modified with a selected window function, based on particular radar hardware and signal to noise constrains. The filter is $g(\rho) = 2B^3\ \sin(2\pi\rho B)/2\pi\rho + (B/\pi^2\rho^2)(\cos(2\pi\rho B) - \sin(2\pi\rho B)/2\pi\rho B)$, where B is the estimated bandwidth of the object being reconstructed. The output of spatial digital filter 1906 is $\text{data}_{filtered}(\rho)$ 1914, which is filtered projection data used by the tomographic reconstruction system illustrated in FIG. 18.

Figure 20:
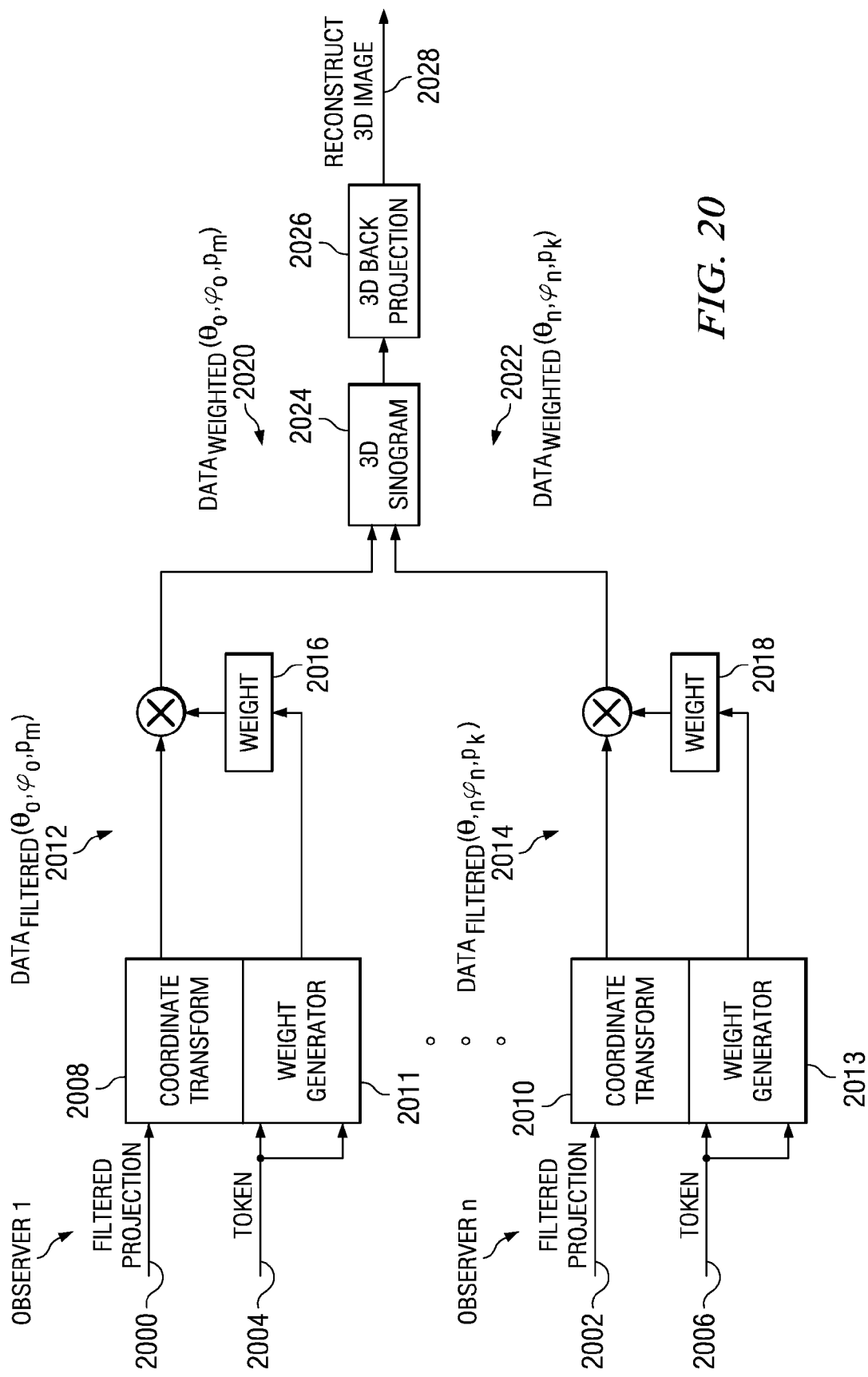
FIG. 20 is a diagram illustrating the reconstruction of a three dimensional image from projection data in accordance with an advantageous embodiment.

Turning now to FIG. 20, a diagram illustrating the reconstruction of a three dimensional image from filtered projection data is depicted in accordance with an advantageous embodiment. In this example, the different components are used in tomographic reconstruction system 1808 in FIG. 18 to create a reconstructed three dimensional image. In this particular example, projections 2000 and 2002 are examples of filtered data that are generated in FIG. 19. Each filtered projection is associated with a token, such as token 2004 and token 2006. This information is input into coordinate transforms 2008 and 2010. The geometric information containing tokens 2004 and 2006 is used to determine the elevation angle $\theta$ and azimuth angle $\phi$ for this line of sight.

$\text{Data}_{filtered}$ 2012 and $\text{data}_{filtered}$ 2014 are then multiplied by weight units 2016 and 2018 respectively to account for the relative geometry at which each observer collects radar projection data, weight units 2016 and 2018 are generated by weight generator 2011 and weight generator 2013. $\text{Data}_{weighted}$ 2020 and $\text{data}_{weighted}$ 2022 are each a single sample point in three dimensional sinogram 2024.

When sufficient data is present in three dimensional sinogram 2024, the centralized node is ready to reconstruct the reflectivity of a three dimensional object. The amount of data necessary will vary depending on the particular implementation. In these examples, the resolution of a reconstructed three dimensional image is determined in part by the sampling density of the three dimensional sinogram. A trade off is present between the achievable resolution and the selected sampling density. In these examples, three dimensional back projection unit 2026 generates reconstructed three dimensional image 2028 from the data in three dimensional sinogram 2024.

Figure 21:
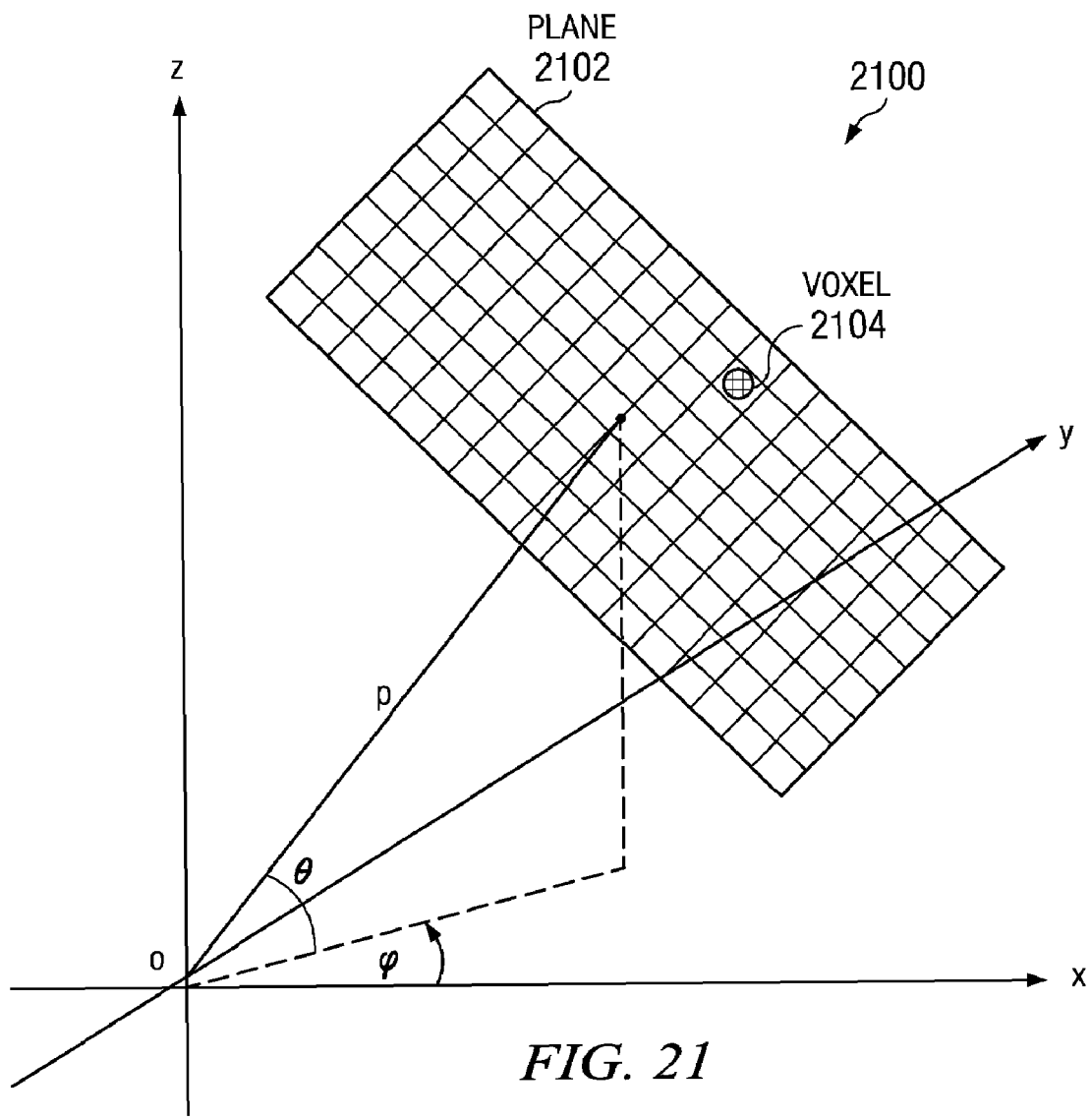
FIG. 21 is a diagram illustrating three dimensional back projection performed by a three dimensional back projection unit in accordance with an advantageous embodiment.

Turning now to FIG. 21, a diagram illustrating three dimensional back projection performed by a three dimensional back projection unit is depicted in accordance with an advantageous embodiment. In this example, graph 2100 illustrates a three dimensional back projection that may be formed using three dimensional back projection unit 2026 in FIG. 20.

Voxel 2104 is an example of a voxel on plane 2102. All the voxel positions on plane 2102, whose normal is a three dimensional vector defined by $(\theta,\phi,\rho)$, accumulates with the same value of $\text{Data}_{filtered}(\theta,\phi,\rho)$. From a different perspective, this may be interpreted as a single value of $\text{Data}_{filtered}(\theta,\phi,\rho)$ being "back projected" onto plane 2102.

Another mode of back projection does not wait for all the necessary sampling points in place in the three dimensional sinogram before starting the three dimensional back projection. As observer nodes upload data from different viewing angles to the central reconstruction node, weighted back projection is already in progress. The cumulative effect of this process is the gradually present appearance of a three dimensional object as additional projections become available and the three dimensional sinogram becomes more densely populated.

Figure 22:
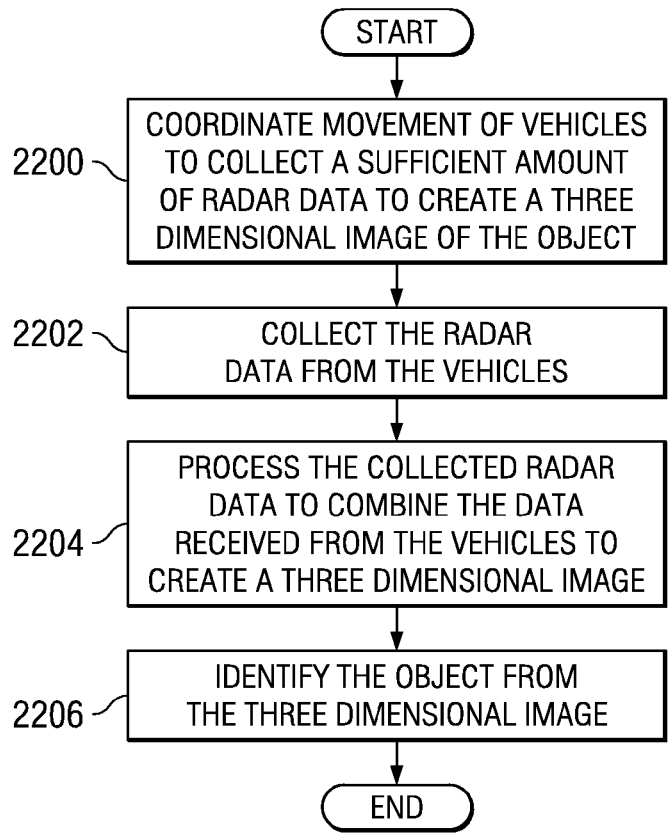
FIG. 22 is a flowchart of a process for identifying an object in accordance with an advantageous embodiment.

Turning now to FIG. 22, a flowchart of a process for identifying an object is depicted in accordance with an advantageous embodiment. The process illustrated in FIG. 22 may be implemented in an imaging system, such as imaging system 200 in FIG. 2.

The process begins by coordinating movement of vehicles to collect a sufficient amount of radar data to create a three dimensional image of the object (operation 2200). In these illustrative examples, the coordination occurs through the use of a sampling map. The sampling map, in these examples, specifically takes the form of a sinogram. Of course, other types of sampling maps may be used for different implementations. For example, a sampling map, based on the three dimensional space using three dimensional coordinates or spherical coordinates, may be used. The sinogram is used by the different vehicles to identify what portions of the data needed to create a three dimensional image of the object have been collected and what portions of the data needed to create the three dimensional image of the object have not been collected. Based on identifying uncollected portions of the data in the sinogram, the different vehicles may adjust their movement to collect the rest of the data.

Additionally, this sampling map also includes an identification of where other vehicles are located. The vehicles may individually make decisions as where to move based on what data has and has not been collected along with where other vehicles are located and the direction of their movement. Alternatively, the central node may give guidance to the different vehicles depending on the particular implementation.

Thereafter, the radar data is collected from the vehicles (operation 2202). In these examples, the radar data take the form of projections that are filtered by the vehicles and returned to a central node for processing. In these examples, the transmission of data is coordinated in a manner to reduce the amount of bandwidth that is needed. In these depicted examples, only one vehicle transmits data and only one vehicle receives data in a coordinated network centric data collection system. Alternatively, depending on the amount of bandwidth and the implementation, the radar data may be sent as it is collected or multiple vehicles may send and receive data at the same time.

Next, the collected radar data is processed to combine the data received from the vehicles to create a three dimensional image (operation 2204). In the illustrative embodiments, the data is combined using a tomographic reconstruction process. In these examples, a tomographic reconstruction process is a process that uses a mathematical algorithm to aggregate multiple measurements taken of an object through various angles. The common usage of tomographic reconstruction processes is for ultrasound and x-ray computed tomography scans.

The different illustrative embodiments use this type of process to reconstruct a three dimensional image of an object. Of course, other types of processes may be used to generate a three dimensional image of the object from the collected radar data. In these examples, the measurements or samples are radar data in the form of projections. Operations 2200 and 2202 may occur simultaneously rather than the order shown in the flowchart for FIG. 22. Thereafter, the object is identified from the three dimensional image (operation 2206) with the process terminating thereafter.

Figure 23:
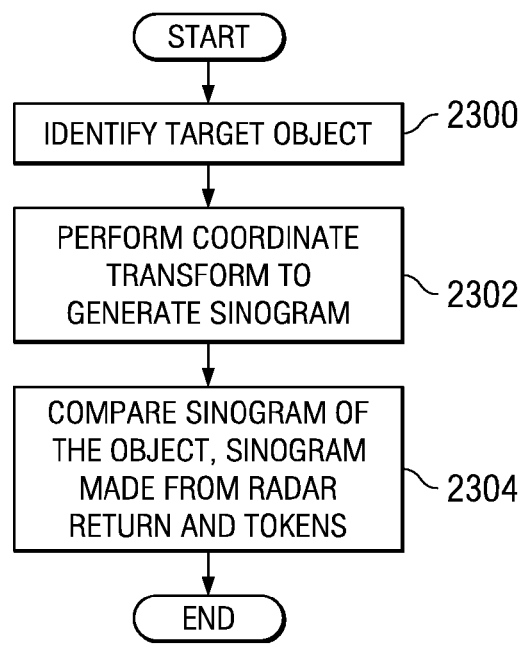
FIG. 23 is a flowchart of a process for creating a sinogram in accordance with an advantageous embodiment.

Turning to FIG. 23, a flowchart of a process for creating a sinogram is depicted in accordance with an advantageous embodiment. The process in FIG. 23 may be implemented in a central node, such as central node 204 in FIG. 2. In these examples, the central node generates a sinogram and distributes the sinogram to the different vehicles in the coordinated network centric data collection system. Alternatively, the different vehicles in the coordinated network centric data collection system could create a sinogram based on an identification of an object received from a central node or other source.

The process begins by identifying the target object (operation 2300). The process then performs a coordinate transform to generate the sinogram (operation 2302). Thereafter, a sinogram of the object and the sinogram made from the radar return and tokens are compared for identification (operation 2304).

Figure 24A:
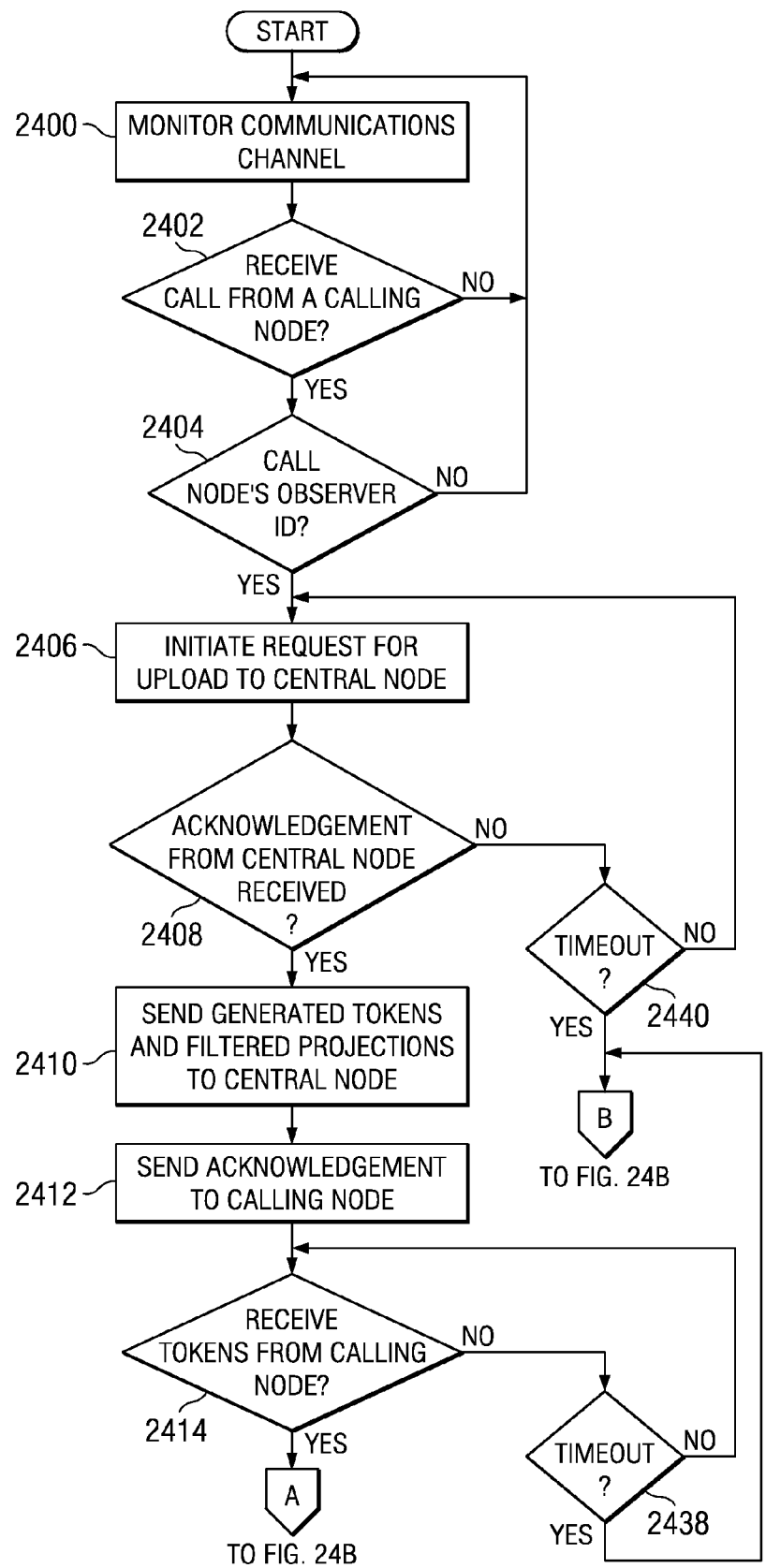
FIGS. 24A and 24B are a flowchart of a process for relaying tokens in accordance with an advantageous embodiment.
Figure 24B:
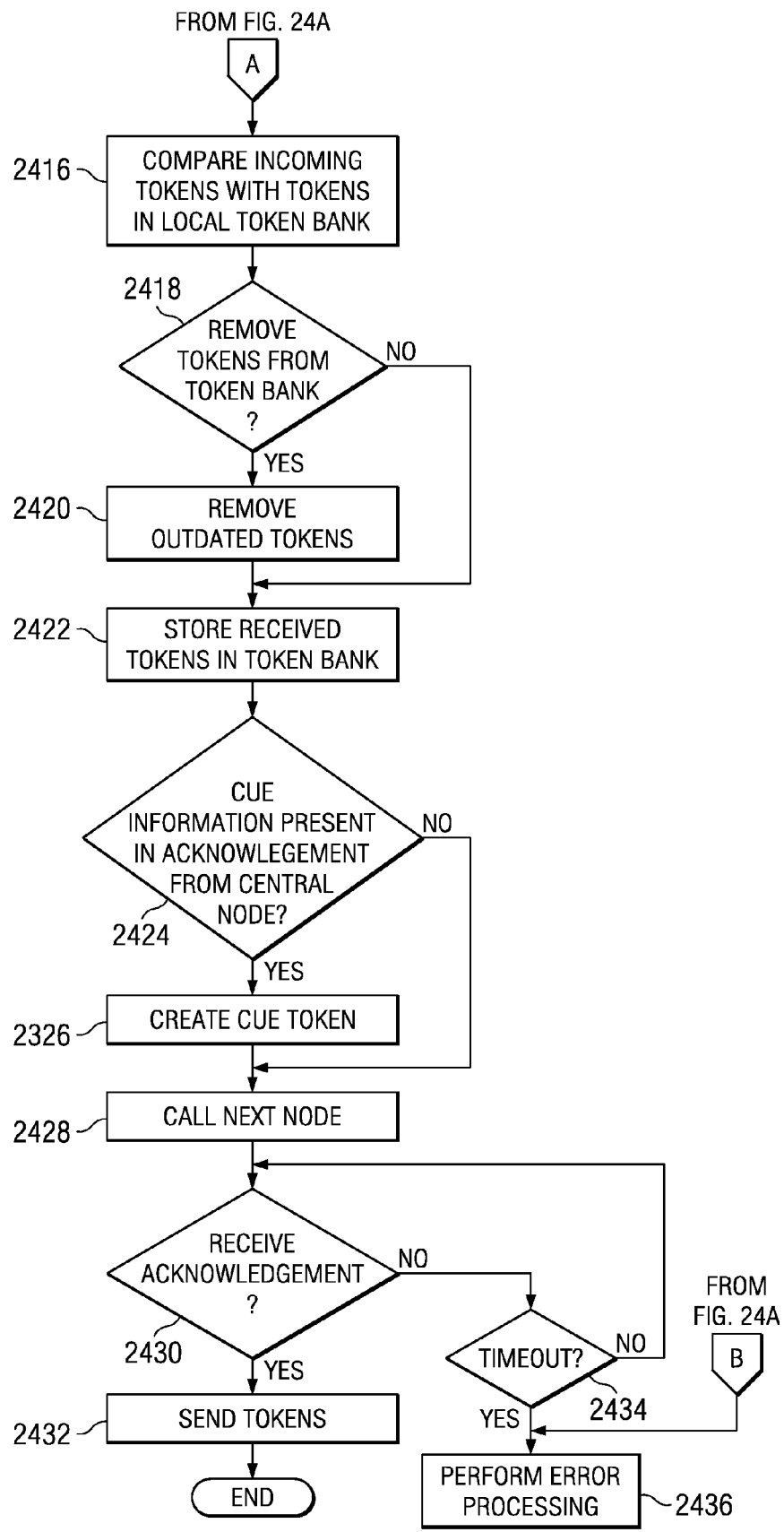

With reference next to FIGS. 24A and 24B, a flowchart of a process for relaying tokens is depicted in accordance with an advantageous embodiment. The process illustrated in FIGS. 24A and 24B may be implemented by an observer node, such as observer node 206 in FIG. 2. In particular, the processes illustrated in this flowchart may be implemented by a component, such as token maker 304 in processing unit 300 in FIG. 3.

The process begins by monitoring the communications channel (operation 2400). In this example, the communications channel is the one used by the different observer nodes to circulate tokens within the coordinated network centric data collection system. A determination is made as to whether a call has been received from a calling node on the communications channel that is designated for the node on which the process is executing (operation 2402). The calling node in operation 2402 is another observer node within the coordinated network centric data collection system. If a call has not been received, the process continues to return to operation 2400 to monitor the communications channel. Otherwise, a determination is made as to whether the observer identifier is for the node on which the process is executed (operation 2404).

If the call is for the node's observer identifier, a request is generated to upload information to the central node (operation 2406). Next, a determination is made as to whether an acknowledgement has been received from the central node to allow upload of data (operation 2408). If an acknowledgement is received, the process sends or transmits tokens generated from the collecting of projections and filtered projections to the central node (operation 2410). Thereafter, an acknowledgement is sent to the calling node to acknowledge that the call has been received to relay tokens (operation 2412).

Next, a determination is made as to whether tokens have been received from the calling node (operation 2414). If tokens have been received from the calling node, the process compares the incoming tokens with tokens stored in the local token bank (operation 2416).

Thereafter, a determination is made as to whether tokens should be removed from the token bank (operation 2418). This determination may include identifying whether space is available for the received tokens. Further, the determination may include identifying whether tokens from other observer nodes are now older than the incoming tokens. If a determination is made to remove tokens from the token bank, the process removes any outdated tokens (operation 2420). Then, the received tokens are stored in the token bank (operation 2422).

After received tokens have been stored in operation 2422, a determination is made as to whether cue information is present in the acknowledgement received from the central node (operation 2424). If cue information is present, a cue token is created (operation 2426). This cue token contains information that may be passed to other nodes for use in identifying a possible location of a target.

The next node is called (operation 2428). In these examples, the next node to be called may be identified from the node identifier. For example, the next node to be called may have a node identifier that has the next lower value as compared to the node identifier for the node on which the process is executed. Of course, other mechanisms may be used to select the next node to be called depending on the particular implementation.

Next, a determination is made as to whether an acknowledgement is received from the called node (operation 2430). If an acknowledgement is received, then the received tokens and the tokens generated by the process in collecting projections are sent to the called node (operation 2432) with the process terminating thereafter.

With reference again to operation 2430, if an acknowledgement is not received from the called node, a determination is made as to whether a timeout has occurred (operation 2434). If a timeout has not occurred, the process returns to operation 2430. Otherwise, the process performs error processing (operation 2436).

With reference back to operation 2424, if cue information is not present in the acknowledgement, the process proceeds directly to operation 2428 as described above. Referring back to operation 2408, if an acknowledgement is not received from the central node, a determination is made as to whether a timeout has occurred (operation 2440). If a timeout has not occurred, the process returns to operation 2406. Otherwise, the process also proceeds to operation 2436 to perform error processing.

Turning again to operation 2414, if tokens have not been received from the calling node, a determination is made as to whether a time out has occurred (operation 2438). If a time out has not occurred, the process loops back to operation 2414. Otherwise, the process proceeds to operation 2436 to perform error processing.

Error processing that occurs in operation 2436 depends on the particular error that occurs. If a called node in operation 2428 does not return an acknowledgement within a selected period of time, the error processing in operation 2436 selects another observer node, assuming that something has gone wrong with the designated observer node. In these examples, the observer node may be selected as the next node in line, based on the identifier of the current node. For example, the next node may be selected as the node having a lower identification number than the current node.

As part of error processing in operation 2436, the process then reinitiates the entire process in the flowchart illustrated in FIGS. 24A and 24B. If again, no acknowledgement is received from the called node, the error processing in operation 2436 will select the next observer node and continue that type of processing until an acknowledgement occurs.

If tokens are never received from a calling node, the node may initiate its own call to the next node as part of the error processing in operation 2436. In other words, operation 2436 would then jump to operation 2406 to request to upload data to the central node in these examples.

The operations performed in the process for the flowchart in FIGS. 24A and 24B are for an event driven asynchronous process that is triggered by a call from an observer node. In sending out tokens and filtered projections to the central node, not necessarily all of the tokens and filtered projections may be sent in a batch. The size of the batch is selected to match the available communications bandwidth. As a result, it may take several calls to send all of the filtered information to the central node depending on the particular implementation.

Figure 25:
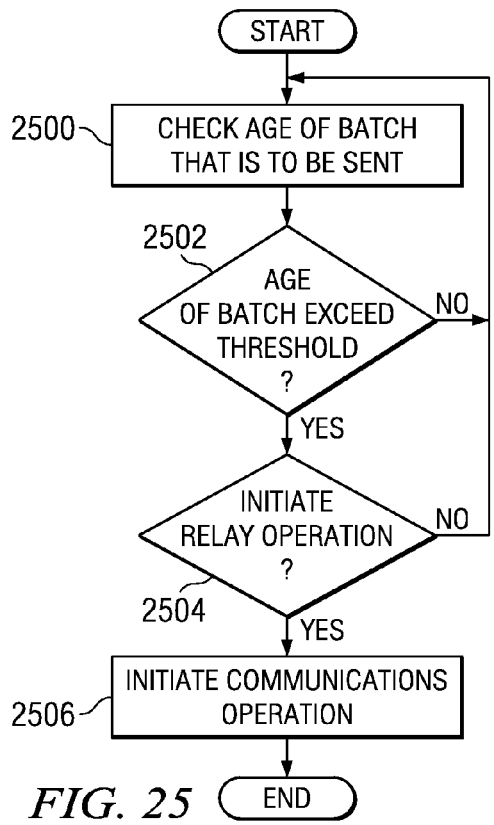
FIG. 25 is a flowchart of a process for a self-healing operation when a relay operation remains uninitiated in accordance with an advantageous embodiment.

Turning now to FIG. 25, a flowchart of a process for a self-healing operation when a relay operation remains uninitiated is depicted in accordance with an advantageous embodiment. This process is used to ensure that a loss of a node in a coordinated network centric data collection system does not result in a breakdown in the collection of radar data to generate a three dimensional image of an object. The process illustrated in FIG. 25 may be implemented in an observer node, such as observer node 206 in FIG. 2. In particular, the process may be implemented in a component, such as token bank 306 in processing unit 300 in FIG. 3.

The age of tokens in a batch to be sent is checked (operation 2500). In these examples, the age of a token equals the difference between the batch time stamp and the current time. A determination is made as to whether the age of the tokens in the batch exceed a time threshold (operation 2502). Whenever a set of tokens is ready to be sent, the tokens are identified as a batch and associated with a time stamp. This time stamp is found in batch time stamp 608 in token 600 in FIG. 6 in these examples.

The age of the tokens in a batch is compared with a threshold value that is used to indicate when an assumption can be made that another node has failed to initiate a relay or communications operation to transmit data.

If the age of the tokens in the batch does not exceed the time threshold, the process returns to operation 2500. Otherwise, an indication that communications has failed is present because the age of tokens in the batch exceed the time threshold.

If the age of the tokens in the batch does exceed the time threshold, then a determination is made as to whether the node on which the process is operating should initiate a relay operation (operation 2504). In these examples, the node that initiates the relay operation or communications operation is selected based on identification numbers. The node with the highest identification number is the node that will reinitiate the communications. Of course, other schemes may be used depending on the particular implementation. For example, a round-robin scheme also may be used to determine which node will reinitiate communications.

If the node on which the process is executing has the highest identification number, the process then initiates the communications operation (operation 2506) with the process terminating thereafter. This process is executed by each node in these examples. If the threshold for the node is exceeded, then the node will then attempt to initiate the communications operation. In this depicted example, each node has a threshold level set based on the identifier number. Thus, the node having the highest identifier number will have the lowest threshold value or shortest time period. The next highest identifier will have the next shortest time period to check for batches. With reference again to operation 2504, if the process is not to initiate communications, the process returns to operation 2500 as described above.

Figure 26:
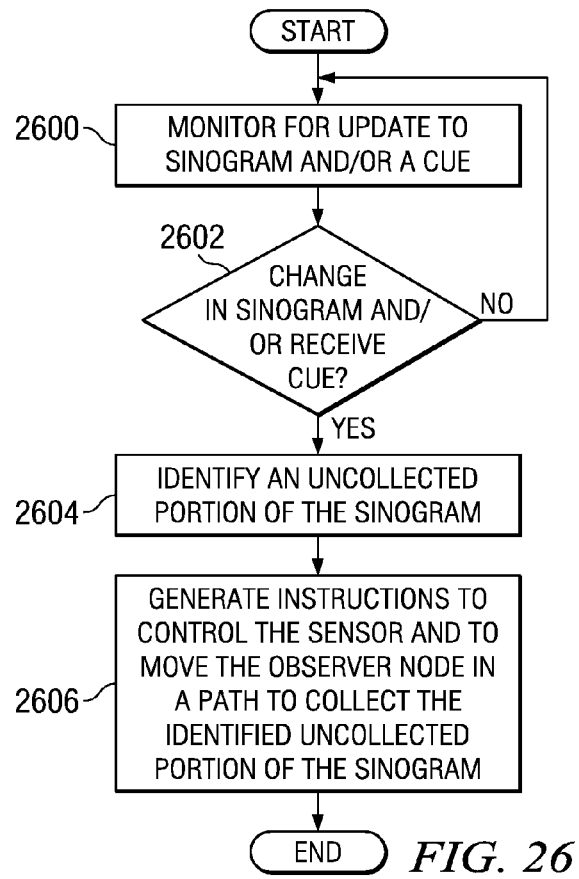
FIG. 26 is a flowchart of a process for coordinating movement of an observer node to collect radar data in accordance with an advantageous embodiment.

Turning now to FIG. 26, a flowchart of a process for coordinating movement of an observer node to collect radar data is depicted in accordance with an advantageous embodiment. The process illustrated in FIG. 26 may be implemented in a processing unit, such as processing unit 300 in FIG. 3. In particular, the different operations illustrated in FIG. 26 may be implemented in optimization algorithm unit 310 in FIG. 3.

The process begins by monitoring for an update to the sinogram and/or a cue (operation 2600). In this operation, the process monitors for changes to the sinogram that is maintained by the observer node. Additionally, the process also monitors for external cues that may be received from the central node. This cue, in these examples, is identification information regarding the target. The cue may include a target location, estimated size of the target, and of the positional uncertainty associated with the cue.

This cue is typically received when the target is first identified. The cue also may be received at a later point in time if the target is moving. When the target is initially identified, the cue may be used by the processing node to generate a sinogram depending on the particular implementation.

Thereafter, a determination is made as to whether a change in the sinogram and/or a receipt of the cue has occurred (operation 2602). If a change in the sinogram and/or a cue has not been received, the process returns to operation 2600. After the sinogram is created, the sinogram may change as tokens are received and generated by the processing unit. Receipt of tokens may indicate that data for portions of the sinogram have been collected. Receipt of the cue may be the initial location of the target or the change in location of the target.

If the sinogram has changed and/or a cue has been received, an uncollected portion of the sinogram is identified (operation 2604). In these examples, operation 2604 identifies a portion of the sinogram that has not been collected, taking into account the travel of the node and other observer nodes.

In these examples, operation 2604 may be implemented with an algorithmal process that minimizes the time needed to complete collecting the radar data identified in the sinogram. Of course, other types of optimizations may be used in operation 2604.

As another example, an optimal flight path may be identified by processing unit 300 in FIG. 3. An exhaustive search may be performed by varying flight profiles of the observers and then measuring the average sampling distance between all of the sampling points. The combination selected is one that gives minimum average distance between sampling points. This selected combination is used to generate flight controlled instructions for each observer in these examples. This operation may be implemented in a manner that the different observer nodes maintain some selected distance from the target in collecting the unidentified portions of the sinogram. As a result, the current node may select a different sinogram based on maintaining the distance rather than minimizing the time needed to obtain the radar data. This illustrative example is one example of selection criteria that may be used.

Of course, other types of processes may be used to select an uncollected portion of the sinogram for collection. Next, instructions to control the sensor and to move the observer node in a path to collect the identified uncollected portion of the sinogram are generated and sent to the control system for the observer node (operation 2606) with the process terminating thereafter.

Figure 27:
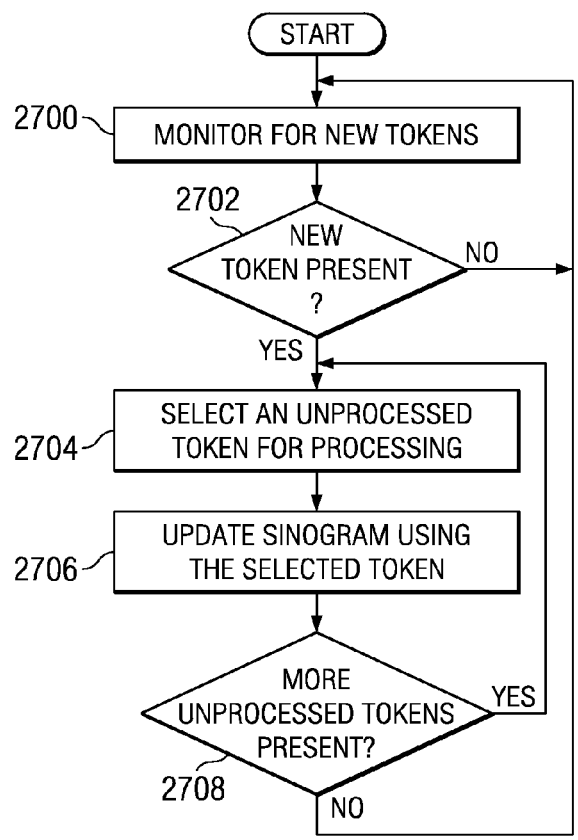
FIG. 27 is a flowchart of a process for updating a sampling map in accordance with an advantageous embodiment.

Turning now to FIG. 27, a flowchart of a process for updating a sampling map is depicted in accordance with an advantageous embodiment. In this example, the process is used to update a sampling map that takes the form of a sinogram. The process illustrated in FIG. 27 may be implemented in a processing unit, such as processing unit 300 in FIG. 3. In particular, the process may be implemented in sinogram unit 308 in FIG. 3 in these examples.

The process begins by monitoring for new tokens (operation 2700). The process may monitor a token bank, such as token bank 306 in FIG. 3 to determine whether new tokens have been received. A determination is then made as to whether the new token is present (operation 2702). If a new token is not present, the process returns to operation 2700. Otherwise, the process selects an unprocessed token for processing (operation 2704).

The process then updates the sinogram using the selected token (operation 2706). Updating the sinogram, in these examples, may take two different forms. The tokens may identify portions of the sinogram that have been collected by an observer node. Alternatively, the tokens also may include information identifying a change in the location of the object for which data is being collected. The change in location may be a translation in position. Additionally, the change in location also may include or alternatively be a rotation of the object about an axis.

For example, the object may turn as it is moving or it may just turn. If the token identifies that new radar has been collected, the sinogram is updated to identify the portion of the sinogram for which data has been collected.

Additionally, the location of the observer node collecting the data also is updated along with the speed and direction of travel of the observer node generating the token. If the token is a "cue" token, then the sinogram may be modified to take into the account the new position of the object.

The modification of the sinogram, in this example, is such that the sinogram still accurately represents the portions of uncollected data and the portions of collected data in the sinogram. As a result, with the updated sinogram, the observer node is able to identify what portions of radar data are still needed to complete the sinogram as well as where the different observer nodes are present relative to the object.

Thereafter, a determination is made as to whether more unprocessed tokens are present (operation 2708). If more tokens are present for processing, the process returns to operation 2704, otherwise, the process returns to operation 2700 to monitor for new tokens.

Figure 28:
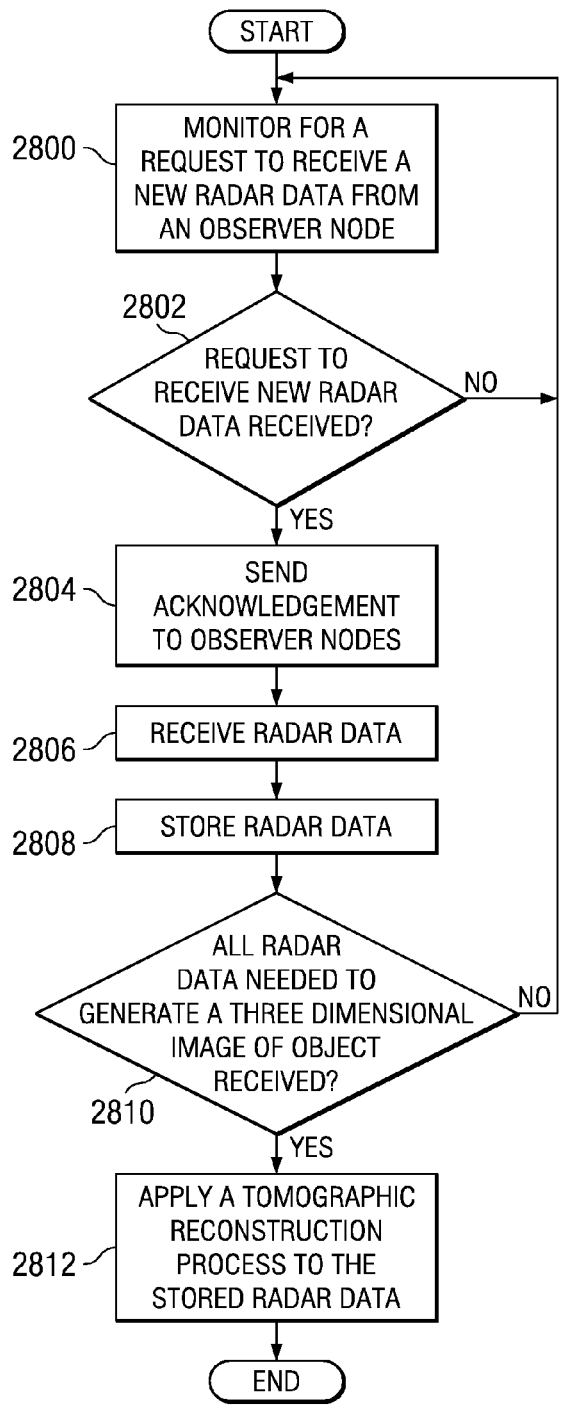
FIG. 28 is a flowchart of a process for creating a three dimensional image of an object in accordance with an advantageous embodiment.

Turning now to FIG. 28, a flowchart of a process for creating a three dimensional image of an object is depicted in accordance with an advantageous embodiment. The process illustrated in FIG. 28 may be implemented in a component, such as central node 204 in FIG. 2.

The process begins by monitoring for a request to receive new radar data from an observer node (operation 2800). In these examples, the new radar data takes the form of filtered projections collected and processed by the different observer nodes in a coordinated network centric data collection system. A determination is then made as to whether a request to receive new radar data has been received (operation 2802). If new radar has not been received, the process returns to operation 2800.

If a request is present to receive new radar data is present, an acknowledgement is sent (operation 2804). The process then receives the radar data (operation 2806). The radar data is then stored (operation 2808). A determination is then made as to whether all of the radar data needed to generate a three dimensional image of the object has been received (operation 2810). A determination at operation 2810 may be made by comparing the received radar data with the sampling map for the object. In these examples, the sampling map is a sinogram. Different criterion may be used to determine the completion of data collection. One example is when the sampling density of a sinogram satisfies a pre-selected minimum separation between sampling points.

In this example, if all of the radar data has been received, the process then applies a tomographic reconstruction process to the stored radar data (operation 2812) with the process terminating thereafter. In some implementations, the tomographic reconstruction process may begin before radar data for all portions of the sinogram have been located. The tomographic reconstruction process is used to combine the radar data to form the three dimensional image of the object.

With reference again to operation 2810, if all the radar data has not been received that is needed to generate the three dimensional image of the object, the process returns to operation 2800 to monitor for more new radar data from an observer node.

Figure 29:
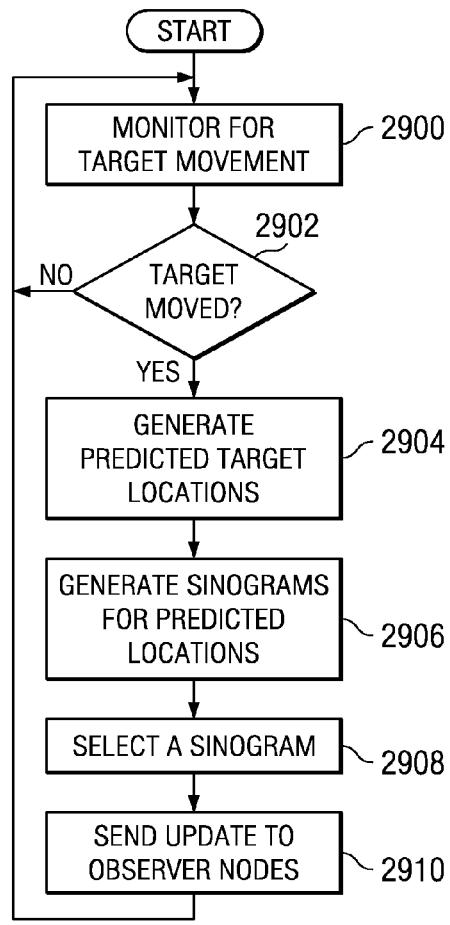
FIG. 29 is a flowchart of a process for updating sinograms with response to target movement in accordance with an advantageous embodiment.

Turning now to FIG. 29, a flowchart of a process for updating sinograms with response to target movement is depicted in accordance with an advantageous embodiment. The process begins by monitoring for target movement (operation 2900). Operation 2900 may monitor for the receipt of moving target indicators in tokens sent from observer nodes. Depending on the particular implementation, operation 2900 may directly monitor for the target movement. A determination is then made as to whether the target has moved (operation 2902). If the target has not moved, the process returns to operation 2900.

Otherwise, the process generates predicted target locations based on the information received regarding the target movement (operation 2904). If moving target indicators are received from the observer nodes, this information includes a location of the target and the observed velocity of the target. Based on receiving this information from a number of different observer nodes, predicted target locations may be generated.

Thereafter, sinograms are generated for the predicted new locations of the target object (operation 2906). The process in operation 2906 is also referred to as sinogram shuffling.

In operation 2906, a sinogram is generated for each predicted location of the object. Each of these new sinograms is based on the current sinogram for the target object. The new sinogram is generated using the predicted new location for the target object. The difference in the location of the target object in the original sinogram or the current sinogram and the new sinogram is used to change the reference or location of the observer nodes.

For example, if the target moves in one direction in physical space, the coordinates of where the object is located has changed relative to the observer nodes. A similar coordinate transformation is made to reflect the location of the observer nodes and the paths needed to collect the different portions of radar data to generate the image.

In this manner, the different observer nodes are able to adjust their movement to obtain the portions of the radar data still needed to complete the collection of data for the sinogram. Thereafter, a sinogram is selected from the different sinograms generated for the different predicted locations (operation 2908). The update is then sent to the observer nodes (operation 2910). Thereafter, the process returns to operation 2900 to monitor for additional target movement.

The update sent to the observer nodes in operation 2910 may take different forms. For example, a cue in a cue token may be sent to the observer nodes identifying the new location of the target object. This new location is the predicted target location selected by the process.

The different embodiments can take the form of an entirely hardware embodiment, an entirely software embodiment or an embodiment containing both hardware and software elements. One embodiment may be implemented in software, which includes but is not limited to firmware, resident software, microcode, or other forms.

Furthermore, the different embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system, or a propagation medium. The medium also may be physical medium or tangible medium on which computer readable program code can be stored. Examples of a computer-readable medium include a semiconductor or solid state memory, magnetic tape, a removable computer diskette, a random access memory (RAM), a read-only memory (ROM), a rigid magnetic disk, an optical disk, or some other physical storage device configured to hold computer readable program code. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the data processing system to enable the data processing system to become coupled to other data processing systems or remote printers or storage devices through intervening private or public networks. Modems, cable modem and Ethernet cards are just a few of the currently available types of network adapters.

The description of various embodiments of the present invention have been presented for purposes of illustration and description, and is not intended to be exhaustive or limited to the invention in the form disclosed. Many modifications and variations will be apparent to those of ordinary skill in the art.

For example, in the illustrative embodiments, all of the observers are moving along a path. In some advantageous embodiments, one or more observers may be stationary. For example, one observe may be vehicle that is stationary either for the entire process of collecting radar data reflected from the target object or just temporarily. The fact that one or more observers are motionless for part or all of the time radar data is being collected does not matter as long as enough radar data is collected to reconstruct a three dimensional image of the target object. As another example, the different illustrative embodiments use coherent radar systems. Other radar systems may be used depending of the type of implementation. For example, non-coherent radar systems may be used in other advantageous embodiments. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A system for creating three dimensional images of a target object, the system comprising:
   a plurality of vehicles having radar systems used to collect radar data about the target object, wherein each in the plurality of vehicles moves in a path to collect a portion of the radar data using a sampling map to coordinate collection of the radar data by the plurality of vehicles and communicates with every other vehicle in the plurality of vehicles to identify uncollected portions of the radar data, and wherein the sampling map comprises a number of three dimensional sinograms that are used to identify the different portions of the radar data needed to create the three dimensional images of the target object;
   a hypothesis generator that, in response to receiving a number of moving target indicators from the plurality of vehicles, generates a number of different hypotheses, wherein the hypotheses estimate a number of possible positions and orientations of the target object, and wherein the hypotheses are used to update the sinograms;
   a central node in communication with the plurality of vehicles, wherein the central node receives the radar data from the plurality of vehicles and creates the three dimensional images for the different hypotheses from the radar data received from the plurality of vehicles using a tomographic reconstruction process to construct voxels of the three dimensional image; and
   an optimization algorithm unit that receives the sinograms and a cue of the target object to generate control instructions, the cue comprising a current location of the target location, and the control instructions being used by a vehicle of the plurality of vehicles for a flight control and a sensor control.

2. The system of claim 1, wherein the central node also collects the radar data.

3. The system of claim 1, wherein a particular vehicle in the plurality of vehicles generates a token identifying when a particular portion of the radar data is collected by the particular vehicle.

4. The system of claim 3, wherein the token includes an identification of the particular portion of the radar data collected by the particular vehicle.

5. The system of claim 1 further comprising:
   a processing unit comprising:
      a filter in communication with a radar system associated with a selected vehicle and capable of filtering the radar data received from the radar system;

a token bank capable of receiving tokens from a communications link with other vehicles in the plurality of vehicles, wherein the tokens received from a remote observer node in a plurality of observer nodes through the communications link are stored in the token bank, wherein a token identifies a position and a location of an observer node when the observer node collects the radar data;

a sinogram unit connected to the token bank, wherein the sinogram unit generates a sinogram used to identify a plurality of samples in a sampling space needed for reconstructing the three dimensional image of the target object;

a token generation unit connected to the filter, wherein the token generation unit generates in response to receiving the radar data from the radar system; and an optimization algorithm unit connected to the sinogram unit capable of generating control instructions using the sinogram, wherein the control instructions are used to direct movement of the selected vehicle to collect a sample in the plurality of samples.

6. The system of claim 1, wherein the target object is a moving target object and wherein the plurality of vehicles updates an origin and an orientation of the sampling map to take into account a change in location of the moving target object to form an updated sampling map that identifies a set of collected portions of the radar data needed to create the three dimensional image of the moving target object and a set of uncollected portions of the radar data still needed to create the three dimensional image of the moving target object.

7. The system of claim 4, wherein the plurality of vehicles updates the sampling map by one of changing the sampling map and receiving a cue of where the target object is located from the central node.

8. The system of claim 4, wherein the plurality of vehicles update the sampling map periodically to take into account the change in location of the moving target object and transmit the moving target indicators to the hypothesis generator, wherein each moving target indicator includes a location, a velocity, and a vector of the target object.

9. The system of claim 1, further comprising:
a filtering unit on each of the plurality of vehicles that filters the collected radar data using a filter specified in a three dimensional tomographic filtered back projection reconstruction algorithm, wherein a plurality of filtered projections are generated based on a number of different portions of the collected radar data in the three dimensional sinograms and the generated hypotheses.

10. The system of claim 1, wherein the plurality of vehicles is selected from a group comprising a plurality of unmanned aerial vehicles; a set of unmanned aerial vehicles and a set of manned vehicles; a set of aircraft and a set of land vehicles; a set of aerial vehicles, a set of water vehicles, and a set of aircraft.

11. The system of claim 1 further comprising:
an additional vehicle having a radar system used to collect the radar data about the target object, wherein the additional vehicle is stationary.

12. The system of claim 1, wherein radar systems for the plurality of vehicles are coherent radar systems.

13. An apparatus, comprising:
a coordinated network centric data collection system having a plurality of nodes, each node having radar systems used to collect radar data about a target object and moving in a path to collect different portions of the radar data using a sampling map to coordinate collection of the radar data, wherein each node communicates with other nodes to identify uncollected portions of the radar data, and wherein the sampling map comprises a number of three dimensional sinograms that are used to identify the different portions of the radar data needed to create a number of three dimensional images of the target object;

a hypothesis generator that, in response to receiving a number of moving target indicators from the plurality of nodes, generates a number of different hypotheses, wherein the hypotheses estimate a number of possible positions and orientations of the target object, and wherein the hypotheses are used to update the sinograms;

a central node in communication with the plurality of nodes that receives the different portions of the radar data collected by the plurality of nodes and creates the three dimensional images for the different hypotheses of the target object from the different portion of the radar data received from the plurality of nodes using a tomographic reconstruction process to construct voxels of the three dimensional images;

an optimization algorithm unit that receives the sinograms and a cue of the target object to generate control instructions, the cue comprising a current location of the target location, and the control instructions being used by a node of the plurality of nodes for a flight control and a sensor control; and a sinogram shuffler that uses the hypotheses generated by the hypothesis generator to update the sinograms that are used by the optimization algorithm.

14. The apparatus of claim 13, wherein a selected three dimensional image of the number of created three dimensional images having a highest similarity match with a given three dimensional template image is determined to be a final reconstructed three dimensional image of the target object.

15. The apparatus of claim 13, wherein each node in the coordinated network centric data collection system stores and updates a copy of the sampling map.

16. The apparatus of claim 13, wherein the sampling map is a sinogram and wherein the central node constructs the three dimensional image of the target object using a tomographic reconstruction process.

17. The apparatus of claim 16, wherein the different nodes collect the radar data in a form of three dimensional projections.

18. The apparatus of claim 13, wherein the central node uses a tomographic reconstruction process to construct the three dimensional image from three dimensional projections collected by the plurality of nodes.

19. The apparatus of claim 13, wherein the target object is a moving target object and wherein the coordinated network centric data collection system updates the sampling map to take into account a change in location of the moving target object to form an updated sampling map that identifies a set of collected portions of the radar data needed to create the three dimensional image of the moving target object and a set of uncollected portions of the radar data still needed to create the three dimensional image of the moving target object.

20. A processing unit for processing data collected by a selected observer node in a plurality of observer nodes, the processing unit comprising:
a filter in communication with a radar system associated with the selected observer node and capable of filtering radar data of a target object received from the radar system, wherein the filter is specified in a three dimensional tomographic filtered back projection reconstruction algorithm, and wherein a plurality of filtered projections are generated based on a number of different portions of the received radar data in a plurality of three dimensional sinograms;

a token bank capable of receiving tokens from a communications link with other observer nodes in the plurality of observer nodes, wherein the tokens received from a remote observer node in the plurality of observer nodes through the communications link are stored in the token bank, and wherein each token comprises a position of an observer node when the observer node collects the radar data and moving target indicators;

a sampling unit connected to the token bank, wherein the sampling unit generates a map used to identify a plurality of samples in a sampling space needed for reconstructing a three dimensional image of the target object, and wherein the map comprises a number of three dimensional sinograms that are used to identify different portions of the radar data needed to create three dimensional images of a target object;

a token generation unit connected to the filter, wherein the token generation unit generates a new token in response to receiving the radar data for a sample from the radar system; and an optimization algorithm unit connected to the sampling unit in which the optimization algorithm unit is capable of receiving the three dimensional sinograms and a cue of the target object and generating control instructions, wherein the control instructions are used to direct movement of the observer node to collect the sample in the plurality of samples.

21. A method for creating a three dimensional image of a target object, the method comprising:

coordinating movement of a plurality of vehicles to collect a selected amount of radar data needed to create the three dimensional images of the target object, wherein the plurality of vehicles have radar systems for collecting the radar data about the target object and detecting movement of the target object;

responsive to detecting movement of the target object, forming a number of different hypotheses, by a hypothesis generator, that estimate a number of possible positions and orientations of the target object, wherein the hypotheses are used to update the sinograms;

controlling a flight path of the plurality of vehicles by an optimization algorithm unit that receives a number of three dimensional sinograms and a cue of the target object to generate control instructions, wherein the cue comprises a current location of the target object;

identifying different portions of the radar data needed to create the three dimensional images of the target object by using the three dimensional sinograms to determine the selected amount of radar data;

collecting the selected amount of the radar data from the plurality of vehicles; and combining the selected amount of the radar data collected from the plurality of vehicles to create the three dimensional image of the target object from the different hypotheses using a tomographic reconstruction process to construct voxels of the three dimensional image.

22. The method of claim 21, wherein the three dimensional image is a final reconstructed three dimensional image, and wherein the combining step comprises:

comparing a number of potential three dimensional images of the target object with a given template image; and determining the final reconstructed three dimensional image, the final reconstructed three dimensional image having a highest similarity match with the given template image among the potential three dimensional images.

23. The method of claim 21, wherein the collecting step comprises;

projecting a plurality of beams onto the target object from coherent radar systems located on the plurality of vehicles; and collecting by each vehicle the radar data in response to projecting the plurality of beams.

24. The method of claim 23, wherein the plurality of beams projected onto the target object are projected sequentially and in a coordinated manner.

25. The method of claim 21, wherein creating the three dimensional image of the target object comprises:

filtering the collected radar data using a filter specified in a three dimensional tomographic filtered back projection reconstruction algorithm.

26. The method of claim 21, wherein the collecting step comprises:

projecting a beam onto the target object from a radar system located on the central node; and collecting by each vehicle the radar data in response to projecting the beam.

27. The method of claim 21, wherein the processing step comprises:

receiving the radar data from the plurality of vehicles at a central node to form received data; and combining the received data at the central node using tomographic process to create the three dimensional image of the target object.

28. The method of claim 21, wherein the coordinating step comprises:

maintaining a sinogram identifying a set of collected portions of the radar data and a set of uncollected portions of the radar data; and generating instructions to coordinate movement of the plurality of vehicles to collect the set of uncollected portions of the radar data.

29. The method of claim 21, wherein the target object is a moving target object and wherein the coordinating step further comprises:

updating a map to take into account changes in a location of the target object.

30. The method of claim 21, wherein the three dimensional image has a resolution sufficient to identify the target object.

* * * * *